US012436051B2

(12) United States Patent
Kollias et al.

(10) Patent No.: US 12,436,051 B2
(45) Date of Patent: Oct. 7, 2025

(54) SENSOR ARRANGEMENT

(71) Applicant: Infineon Technologies AG, Neubiberg (DE)

(72) Inventors: Athanasios Kollias, Munich (DE); Marc Fueldner, Neubiberg (DE); Matthias Friedrich Herrmann, Munich (DE); Gunar Lorenz, Deisenhofen (DE); Andreas Wiesbauer, Pörtschach a.W. (AT)

(73) Assignee: Infineon Technologies AG, Neubiberg (DE)

( * ) Notice: Subject to any disclaimer, the term of this patent is extended or adjusted under 35 U.S.C. 154(b) by 386 days.

(21) Appl. No.: 18/062,886

(22) Filed: Dec. 7, 2022

(65) Prior Publication Data

US 2023/0184610 A1 Jun. 15, 2023

(30) Foreign Application Priority Data

Dec. 9, 2021 (EP) .................................... 21213416

(51) Int. Cl.
*G01L 9/00* (2006.01)
*H04R 7/06* (2006.01)

(52) U.S. Cl.
CPC .............. *G01L 9/0072* (2013.01); *H04R 7/06* (2013.01)

(58) Field of Classification Search
CPC ... G01L 9/0072; G01L 9/0073; G01L 9/0075; G01L 19/0092
See application file for complete search history.

(56) References Cited

U.S. PATENT DOCUMENTS

| 9,670,059 | B2 | 6/2017 | Dehe et al. |
| 9,809,448 | B2* | 11/2017 | Lim ......................... B81B 7/02 |
| 10,934,160 | B2* | 3/2021 | Doller .................. B81B 7/0048 |
| 2014/0175572 | A1 | 6/2014 | Hsu et al. |
| 2015/0251899 | A1 | 9/2015 | Dehe et al. |
| 2019/0352176 | A1* | 11/2019 | Doller .................. B81B 7/0048 |

FOREIGN PATENT DOCUMENTS

| CN | 106535071 A | * | 3/2017 | ............. H04R 19/04 |
| WO | WO-2018091644 A1 | * | 5/2018 | ........... B81B 7/0048 |
| WO | WO-2018096130 A1 | * | 5/2018 | ........... B81B 3/0021 |

OTHER PUBLICATIONS

Machine Translation of CN 106535071 A (Year: 2016).*

* cited by examiner

*Primary Examiner* — Nathaniel J Kolb
(74) *Attorney, Agent, or Firm* — Slater Matsil, LLP

(57) ABSTRACT

A sensor arrangement includes a substrate having a through opening between a first and a second main surface region, a sound transducing portion at the first main surface region of the substrate and spanning the through opening in the substrate, and a pressure sensing portion at the first main surface region of the substrate and fluidically coupled to the through opening in the substrate. The sound transducing portion includes a deflectable membrane structure, and a counter electrode. The pressure sensing portion includes a first and second rigid electrode and a deflectable membrane structure. The deflectable membrane structure of the pressure sensing portion opposes the plane of the first main surface region of the substrate. The first and second rigid electrodes of the pressure sensor form a reference capacitor of the pressure sensor, and the second rigid electrode and the membrane structure form a sense capacitor of the pressure sensor.

19 Claims, 17 Drawing Sheets

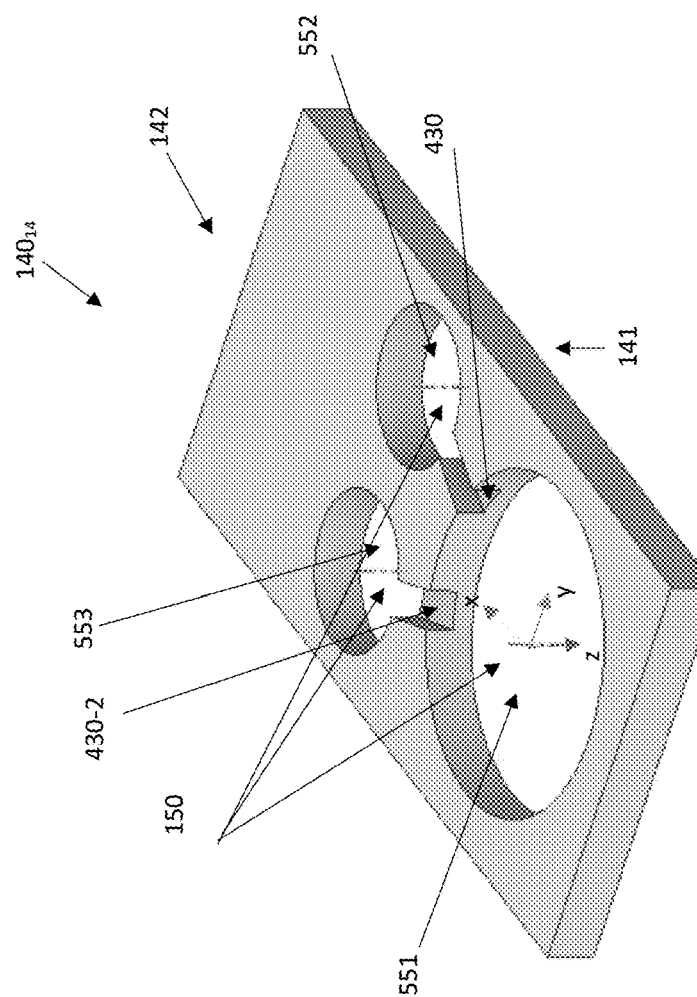
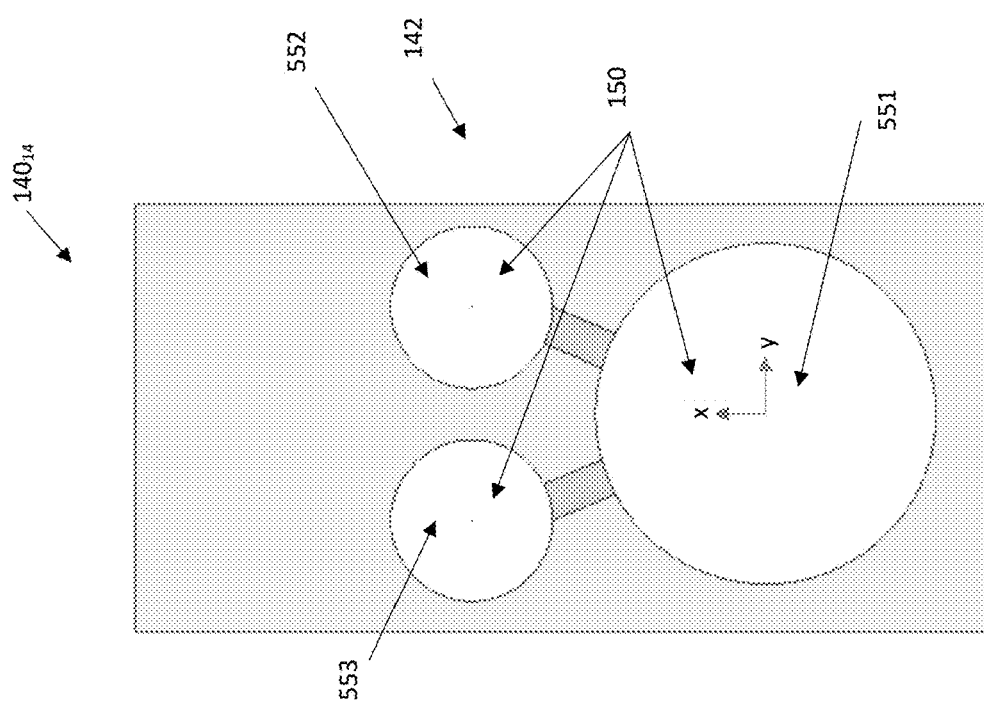
Fig. 14B
Fig. 14A

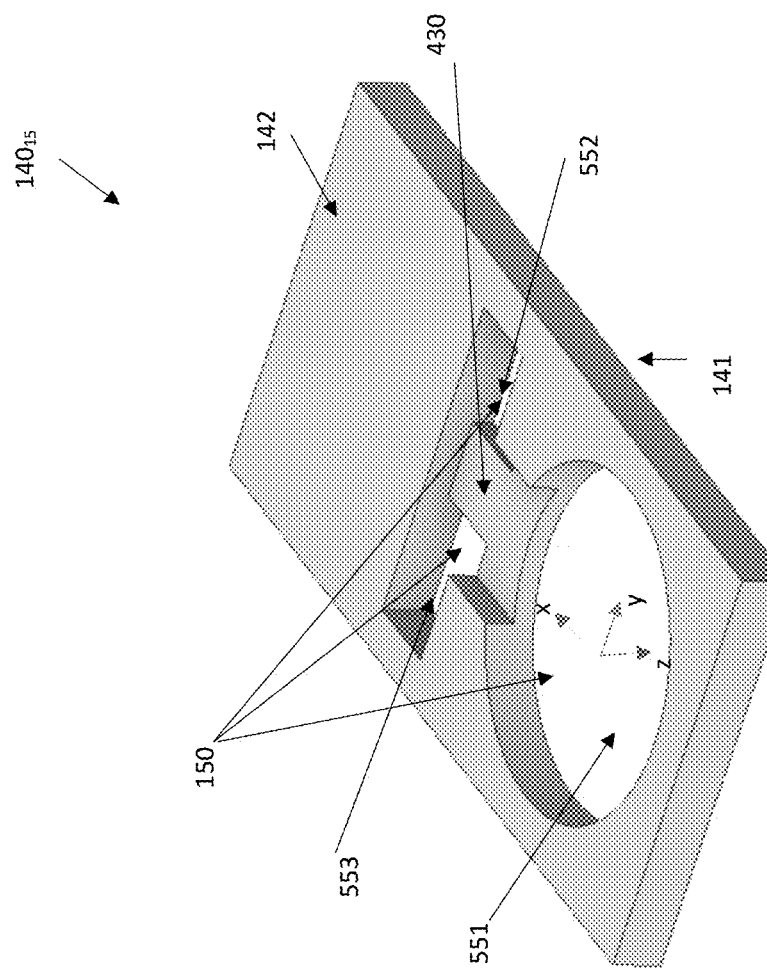
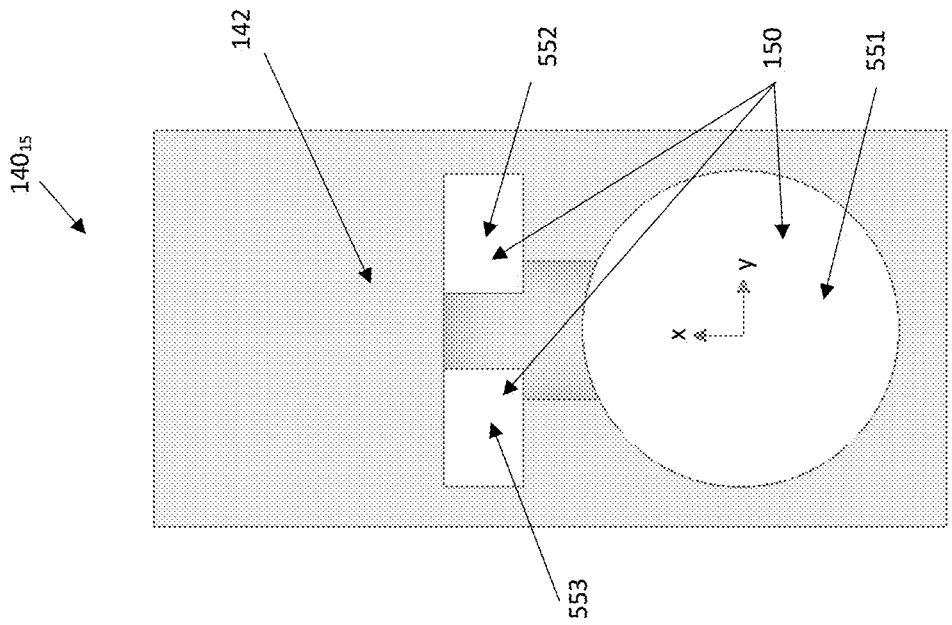
Fig. 15B
Fig. 15A

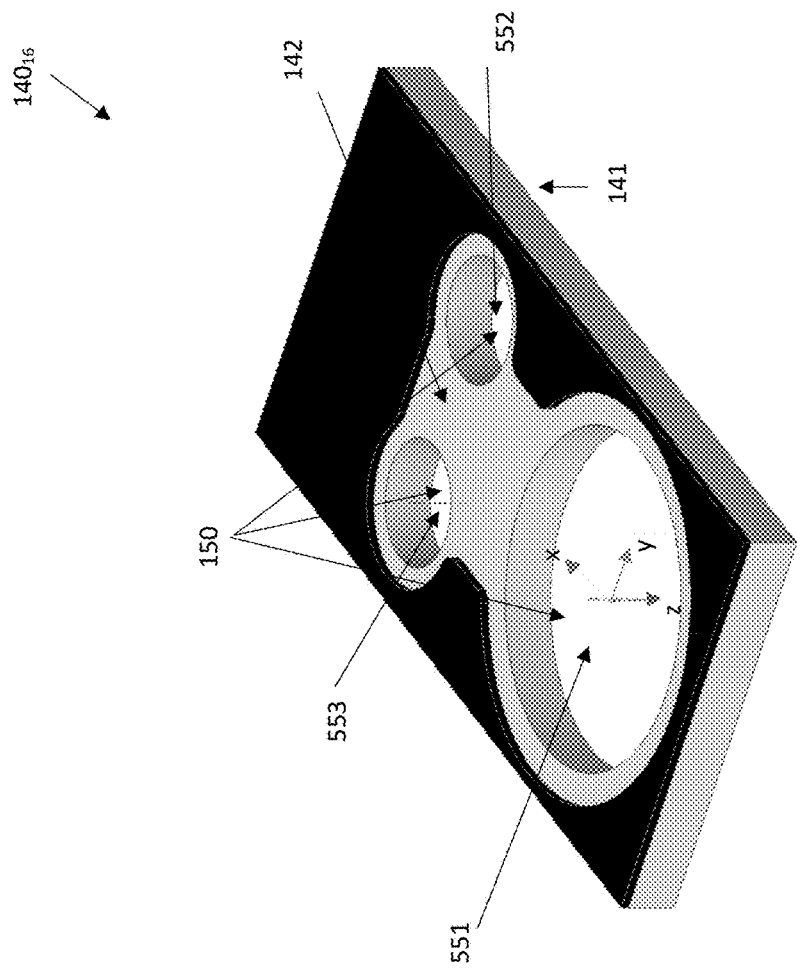
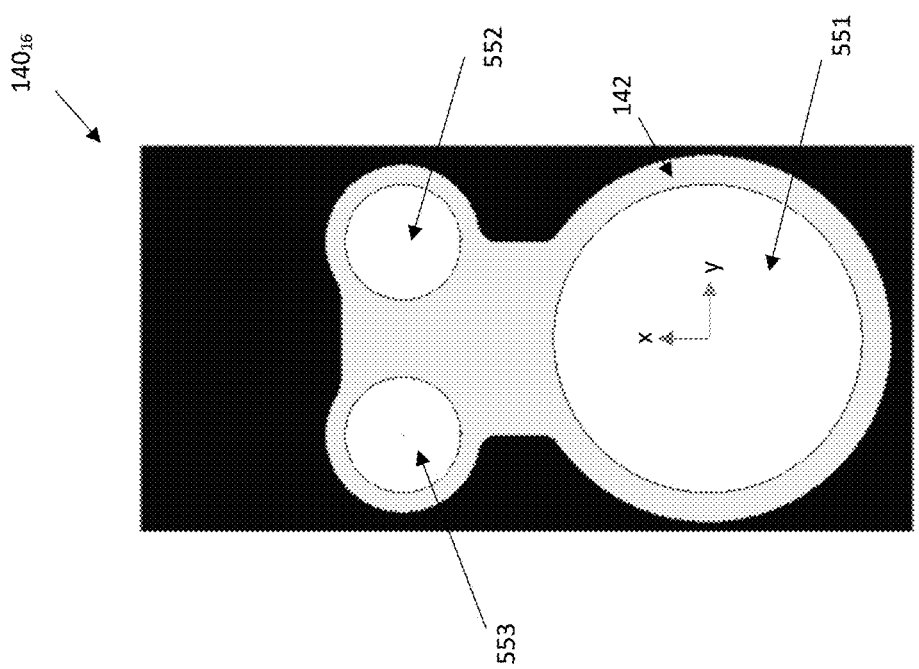
Fig. 16B
Fig. 16A

SENSOR ARRANGEMENT

CROSS-REFERENCE TO RELATED APPLICATIONS

This application claims the benefit of European Patent Application No. 21213416, filed on Dec. 9, 2021, which application is hereby incorporated herein by reference.

TECHNICAL FIELD

Embodiments according to the present application are concerned with a sensor arrangement. More specifically, embodiments are concerned with sound and pressure detecting structures used in portable electronic devices, e.g. smartphones, such as a combo sensor for acoustic and static pressure detection.

Further embodiments are related to a portable electronic device.

According to an aspect, embodiments can be applied to provide an effective integration of multiple sensors, such as a combo sensor, in a single package, e.g. in form of a combined sensor arrangement within the portable electronic device.

BACKGROUND

The sensing of environmental parameters in the ambient atmosphere, such as sound (acoustic pressure), static pressure, etc., with MEMS-based devices gains more and more importance in the implementation of appropriate sensors within mobile devices, home automation, such as smarthome, and the automotive sector.

Sound and pressure detecting structures, e.g. MEMS microphones, barometers, absolute pressure sensors in the 30-110 kPa range, have found use in smartphones since many years. With the advance of consumer products like wearables and hearables it became evident that these devices are also critical for several use cases. However, typically the space available in these devices is limited.

Therefore, there is a need in the field of sensor arrangements to implement a sensor arrangement having smaller component form factor for allowing the integration of multiple sensors in a single package, when compared to sensor arrangements.

Such a need can be solved by the sensor arrangement according to independent claim 1.

Further, specific implementations of the sensor arrangement are defined in the dependent claims.

SUMMARY

According to an embodiment of the disclosure, a sensor arrangement, e.g. a combo sensor, comprises a substrate having a through opening, e.g. a so-called Bosch cavity, between a first and a second main surface region, e.g. between a front and a back side, thereof, a sound transducing portion, e.g. sound transducer, e.g. microphone, arranged at the first main surface region of the substrate and at least partially spanning the through opening in the substrate, and a pressure sensing portion, e.g. a pressure sensor, arranged at the first main surface region of the substrate and fluidically coupled to the through opening in the substrate. The sound transducing portion comprises a deflectable membrane structure, and a counter electrode, e.g. back plate-stator. The pressure sensing portion comprises a first and second rigid electrode and a deflectable membrane structure in a stacked configuration (in a vertically spaced and separated configuration). The deflectable membrane structure of the pressure sensing portion opposes the plane of the first main surface region of the substrate. The first and second rigid electrodes of the pressure sensing portion form a reference capacitor of the pressure sensing portion, and the second rigid electrode and the membrane structure form a sense capacitor of the pressure sensing portion in a stacked configuration (in a vertically spaced and separated configuration).

This embodiment of the disclosure is based on the finding that structuring each of three conductive layers of the pressure sensing portion independently so as to enable at least two capacitors in the pressure sensing portion. In this embodiment, the top capacitor in the pressure sensing portion can be used as a reference capacitor stacked up (vertically spaced and separated) on top of the sensor capacitor. These two capacitors share the same middle electrode. The first rigid electrode, e.g. a stiff membrane, makes the pressure sensing portion insensitive to the pressure variations of the back volume. Therefore, no additional area is required for the reference capacitors of the pressure sensing portion, e.g. the absolute pressure sensor, while maintaining a high sensor signal.

The sense, e.g. sensor, capacitor and the corresponding membrane, e.g. the deflectable membrane structure, are directly facing the back volume in this embodiment. This configuration enables a parallel connection between the sound transducing portion and the pressure sensing portion, which solves the issue with the limited bandwidth of the pressure sensor.

In the embodiment, a configuration of such a device is created, which has the required MEMS (microelectromechanical system) structures for detecting sound and absolute pressure on the same chip, has the required ASIC (application-specific integrated circuit) signal paths in a single chip, and is integrated in a bottom port package of a microphone of a portable electronic device, which is critical for the microphone performance. The sensor arrangement according to the embodiment does not show cross-talk meaning that the sound and pressure coexistence errors are negligible, thus does not show any performance degradation due to the integration and at the same time demonstrate performance parity to their corresponding standalone devices.

In the embodiment, a sensor arrangement implemented in a single chip without bandwidth limitation of the pressure sensor is created, which provides an improved sensor performance.

An embodiment creates a portable electronic device, e.g. a smartphone, comprising the sensor arrangement according to any of the embodiments described herein.

This embodiment is based on the ideas discussed above with respect to the sensor arrangement and can optionally be supplemented by any of the features, functionalities and details discussed with respect to the sensor arrangement.

Embodiments of the disclosure can be effectively used in the MEMS microphones and pressure sensors, e.g. those used in smartphones, to provide the required MEMS structures for detecting sound and absolute pressure on the same chip.

BRIEF DESCRIPTION OF THE DRAWINGS

Embodiments of the present application are set out below taking reference to the figures among which

FIG. 14A shows a schematic plane view of a substrate of a sensor arrangement according to an embodiment;

FIG. 14B shows a schematic perspective view of a substrate of a sensor arrangement according to an embodiment;

FIG. 15A shows a schematic plane view of a substrate of a sensor arrangement according to an embodiment;

FIG. 15B shows a schematic perspective view of a substrate of a sensor arrangement according to an embodiment;

FIG. 16A shows a schematic plane view of a substrate of a sensor arrangement according to an embodiment; and FIG. 16B shows a schematic perspective view of a substrate of a sensor arrangement according to an embodiment.

In the following description, embodiments are discussed in further detail using the figures, wherein in the figures and the specification identical elements and elements having the same functionality and/or the same technical or physical effect are provided with the same reference numbers or are identified with the same name. Thus, the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, some of the figures comprise a Cartesian coordinate system x, y, z, wherein the x-y-plane corresponds, i.e. is parallel, to a first main surface region of a substrate (=a reference plane=x-y-plane), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction or a direction parallel to the x-y-plane, wherein the term "vertical" means a direction parallel to the z-direction.

Figure 1:
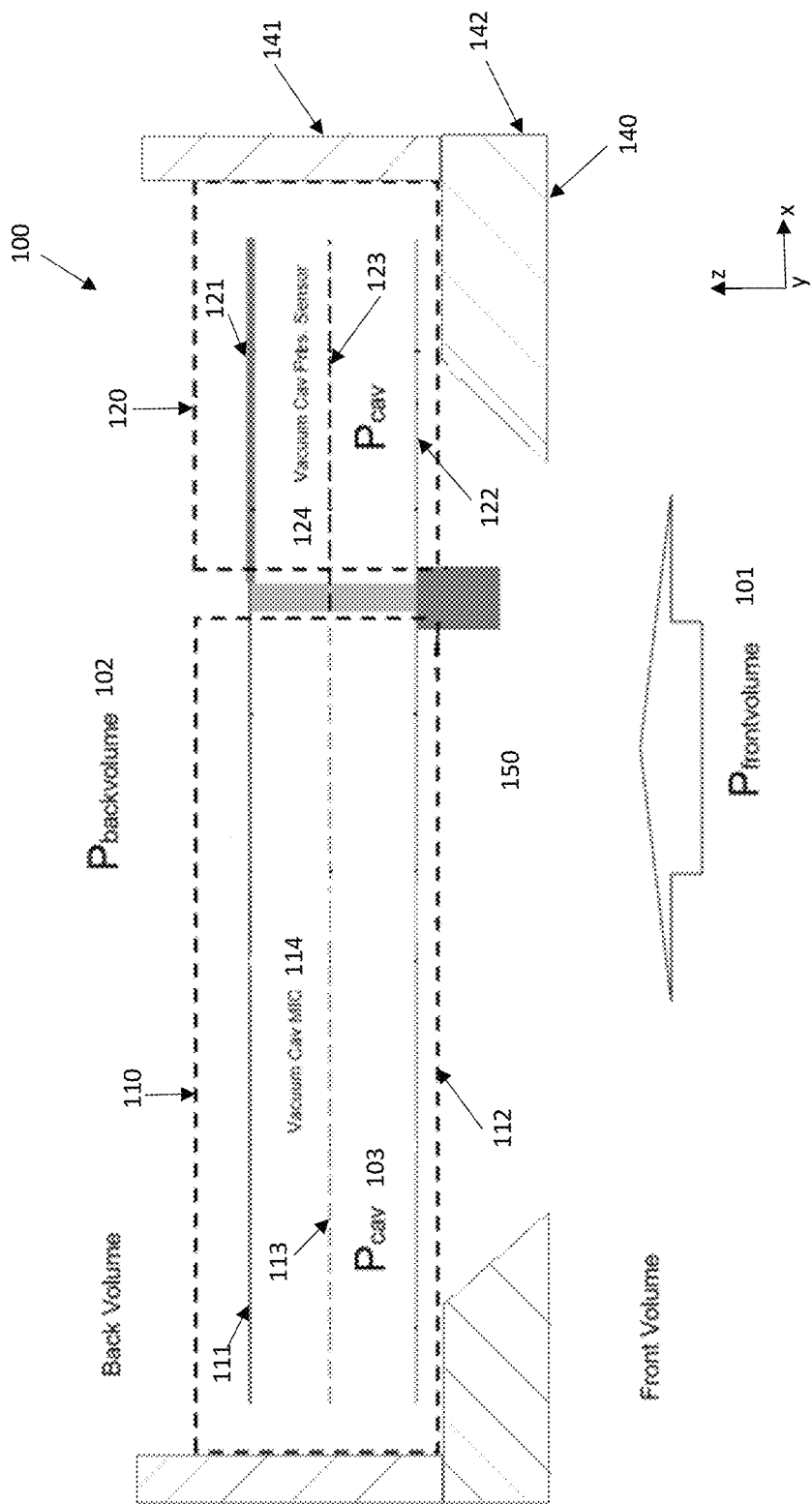
FIG. 1 shows a schematic cross-sectional view of a sensor arrangement according to an embodiment.

FIG. 1 shows a sensor arrangement 100 in accordance with an embodiment. The sensor arrangement is schematically shown in a cross-sectional view, principally showing the inner structure of the sensor arrangement 100.

The sensor arrangement 100 comprises a substrate 140 having a through opening 150, e.g. a so-called Bosch cavity, between a first 141 and a second 142 main surface region, e.g. between a front and a back side, thereof. The sensor arrangement 100 comprises a sound transducing portion 110, e.g. sound transducer, e.g. a microphone, arranged at the first main surface region 141 of the substrate 140 and at least partially (or completely) spanning the through opening 150 in the substrate 140. The sensor arrangement 100 comprises a pressure sensing portion 120, e.g. a pressure sensor, arranged at the first main surface region 141 of the substrate 140 and fluidically coupled to the through opening 150 in the substrate 140. The sound transducing portion 110 comprises a deflectable membrane structure 111, 112, and a counter electrode 113, e.g. back plate or stator. The pressure sensing portion 120 comprises a first 121 and second 123 rigid electrode and a deflectable membrane structure 122 in a stacked configuration, such as in a vertically spaced (and separated) configuration. The deflectable membrane structure 122 of the pressure sensing portion 120 opposes the plane of the first main surface region 141 of the substrate. The first 121 and second 123 rigid electrodes of the pressure sensing portion 120 form a reference capacitor of the pressure sensing portion 120, and the second rigid electrode 123 and the membrane structure 122 form a sense capacitor of the pressure sensing portion 120 in a stacked configuration, such as in a vertically spaced (and separated) configuration.

The first 121 and second 123 rigid electrodes are at least 10 times, or 50 times, or 100 times stiffer in a vertical deflection direction than the deflectable membrane structure 122. The terms "rigid" and "deflectable" are intended to illustrate the relation between the stiffness of "rigid" and "deflectable" elements, particularly that the stiffness of the "rigid" element is at least 10 times, or 50 times, or 100 times stiffer in a vertical deflection direction than the stiffness of the "deflectable" element. Both the sound transducing portion 110 and the pressure sensing portion 120 may comprise three conductive layers, as shown in FIG. 1. Each layer can be structured independently so as to enable two or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Figure 2A:
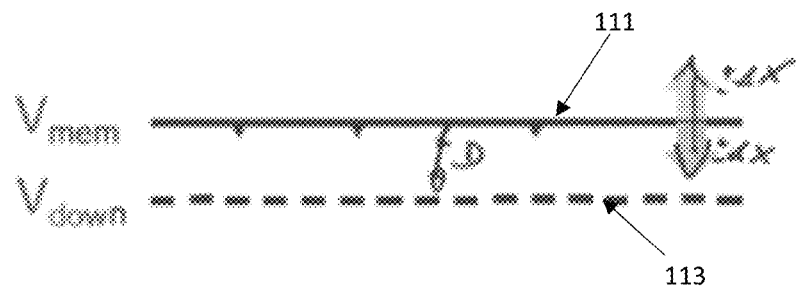
FIGS. 2A-2D show schematic cross-sectional views of the MEMS sound transducer in different configurations (—in a single membrane and backplate configuration, —in a (sealed) dual membrane configuration, —in a dual-backplate configuration, and in a single membrane and backplate configuration with the backplate on top of the membrane) according to an embodiment.

FIG. 1 shows the sound transducing portion 110 in a dual-membrane configuration, as the one shown in FIG. 2B and described below. Alternatively, the sound transducing portion 110 may have one of the configurations as shown in FIGS. 2A and 2C and described below, e.g. a single membrane and single backplate (=counter-electrode) configuration as shown in FIG. 2A, or e.g. a dual-backplate configuration, as shown in FIG. 2C.

Both the sound transducing portion 110 and the pressure sensing portion 120 comprise deflectable membrane structures comprising movable (=deflectable) sensing membranes.

The sound transducing portion 110 comprises a deflectable membrane structure 111, 112, e.g. comprising sensitive membranes, and a counter electrode 113, e.g. a back plate or stator. The deflectable membrane structure 111, 112 of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110, senses the pressure difference between the front volume 101 and the back volume 102 ($P_{frontvolume}-P_{backvolume}$) and ignores the cavity pressure $P_{cav}$, 103, which is created within a cavity 114 between the first and second membrane elements 111, 112 of the sound transducing portion 110.

In an alternative embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided. Alternatively, the deflectable membrane structure may be formed not only as an SDM structure, but also as a SBP (single backplate) structure, or as a DBP (dual backplate) structure, for example, when the pressure sensing part 120 is formed as an extension of a single backplate SiMic (silicon microphone).

The first deflectable membrane element 111 comprises a deflectable portion. The second deflectable membrane element 112 comprises a deflectable portion. In an alternative embodiment, the deflectable portions of the first and second membrane elements 111, 112 may be mechanically coupled, e.g. through pillars, to each other. The mechanical coupling, e.g. through pillars, prevents the sound transducing portion 110 from deformation during the operation. The more stable construction of the sound transducing portion 110 is thus provided. At the same time, the deflectable portions of the first and second membrane elements 111, 112 may be mechanically decoupled from the counter electrode 113.

The first rigid electrode 121, e.g. a stiff membrane, makes the pressure sensing portion 120 insensitive to the pressure variations of the back volume. The pressure sensing portion 120 senses the pressure difference between the front volume and a vacuum cavity 124 between the first rigid electrode 121 and the deflectable membrane structure 122 of the pressure sensing portion 120 ($P_{frontvolume}-P_{backvolume}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration (in a vertically spaced and separated configuration). The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The deflectable membrane structure 122 of the pressure sensing portion 120 comprises a deflectable portion. In an alternative embodiment, the deflectable portion of the deflectable membrane structure 122 may be mechanically coupled, e.g. through pillars, to the first rigid electrode 121 and mechanically decoupled from the second rigid electrode 123. The mechanical coupling, e.g. through pillars, prevents the sound transducing portion 110 from deformation during the operation. The more stable construction of the sound transducing portion 110 is thus provided. In an alternative embodiment, the deflectable portion of the deflectable membrane structure 122 of the pressure sensing portion 120 is mechanically decoupled from the first rigid electrode 121 and from the second rigid electrode 123. In such alternative embodiment the pressure sensing portion 120, for example, comprises no pillars. In this embodiment, an improved sensitivity of the membrane structure is provided due to an increased area of deflection, e.g. since pillars connecting the first rigid electrode and the deflectable portion of the membrane structure are eliminated completely.

In an embodiment, the first deflectable membrane element 111 of the sound transducing portion 110 and the first rigid electrode 121 of the pressure sensing portion 120 are arranged in the same plane with respect to the first main surface region 141 of the substrate 140. In an embodiment, the counter electrode 113 of the sound transducing portion 110 and the second rigid electrode 123 of the pressure sensing portion 120 are arranged in the same plane with respect to the first main surface region 141 of the substrate 140. In an embodiment, the second deflectable membrane element 112 of the sound transducing portion 110 and the deflectable membrane structure 122 of the pressure sensing portion 120 are arranged in the same plane with respect to the first main surface region 141 of the substrate 140.

In an embodiment, the first deflectable membrane element 111 of the sound transducing portion 110 and the first rigid electrode 121 of the pressure sensing portion 120 are not arranged in the same plane, e.g. arranged in different planes, with respect to the first main surface region 141 of the substrate 140. In an embodiment, the first rigid electrode 121 of the pressure sensing portion 120 is arranged in a plane, which is below a plane of the first deflectable membrane element 111 of the sound transducing portion 110 with respect to the first main surface region 141 of the substrate 140.

In an embodiment, the counter electrode 113 of the sound transducing portion 110 and the second rigid electrode 123 of the pressure sensing portion 120 are not arranged in the same plane, e.g. arranged in different planes, with respect to the first main surface region 141 of the substrate 140. In an embodiment, the second rigid electrode 123 of the pressure sensing portion 120 is arranged in a plane, which is below a plane of the counter electrode 113 of the sound transducing portion 110 with respect to the first main surface region 141 of the substrate 140.

In an embodiment, the sensor arrangement 100 may comprise a mechanical decoupling structure, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure may provide, e.g. enable, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. In an embodiment, the mechanical decoupling structure may be anchored to the first main surface region 141 of the substrate 140. The mechanical decoupling structure enables a mechanically independent movement of the sensitive membranes of the sound transducing portion and the pressure sensing portion. The mechanical decoupling structure mechanically isolates the pressure sensing portion 120 from the sound transducing portion 110.

The pressure sensing portion 120 partially (or completely) spans the through opening 150 in the substrate 140. This embodiment provides a parallel fluidical connection between the sound transducing portion and the pressure sensing portion.

In an embodiment, the through opening may comprise a plurality of through opening portions, wherein a first through opening portion is associated to the sound transducing portion spanning at least partially (or completely) the first through opening portion, and wherein a second through opening portion is associated to the pressure sensing portion spanning at least partially the second through opening portion. This results in a formation of a rigid mechanical connection between the sound transducing portion and the pressure sensing portion, enables a mechanically independent movement of the sensitive membranes of the sound transducing portion and the pressure sensing portion and a parallel fluidical connection between the sound transducing portion and the pressure sensing portion.

The sensor arrangement 100 shown in FIG. 1 provides an embodiment, where no additional area is required for the reference capacitors of the pressure sensing portion 120, e.g. the absolute pressure sensor, while maintaining a high sensor signal. This is provided due to the configuration, where the first and second rigid electrodes 121, 123 of the pressure sensing portion 120 form a reference capacitor and the second rigid electrode 123 and the deflectable membrane structure 122 of the pressure sensing portion 120 form a sense capacitor in a stacked configuration, e.g. in a vertically spaced and separated configuration.

The sense, e.g. sensor, capacitor and the corresponding membrane, e.g. the deflectable membrane structure 122 are directly facing the back volume in an embodiment. The sound transducing portion 110 and the pressure sensing portion 120 are fluidically connected in parallel. This parallel connection between the sound transducing portion 110 and the pressure sensing portion 120 is also schematically shown in FIG. 3. This parallel connection solves the problem of the limited bandwidth of the pressure sensor.

In an embodiment, the sensor arrangement 100 is formed as a single chip, e.g. as a MEMS chip.

The sensor arrangement 100 described above could be a part of a portable electronic device, e.g. a smartphone.

However, it should be noted that the sensor arrangement 100 may optionally be supplemented by any of the features, functionalities and details disclosed herein, both individually or taken in combination.

Figure 2B:
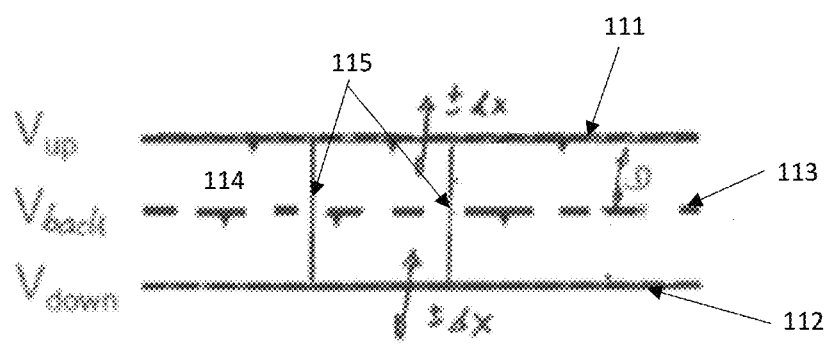
Figure 2C:
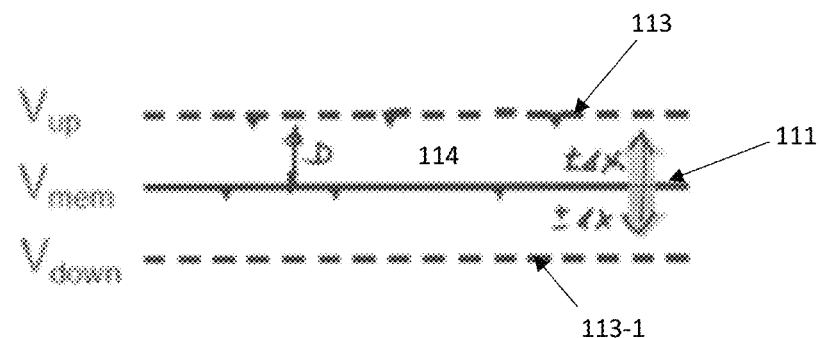

FIGS. 2A-2C show a schematic cross-sectional views of a MEMS sound transducer, which could be used as a sound transducing portion 110 shown in FIG. 1 described above and below described Figures in different configurations, such as in a single membrane and single backplate (=counter-electrode) configuration, in a (e.g., sealed) dual membrane configuration and in a dual-backplate configuration. The terms "electrode" and "structure" are intended to illustrate that the membrane structure(s), the counter-electrode(s) and the rigid electrode(s), respectively, can comprise a semi-conductive or conductive layer or, also, a layer sequence or layer stack having a plurality of different layers, wherein at least one of the layers is electrically conductive, e.g. a conductive poly-silicon layer.

FIG. 2A shows a schematic cross-sectional view of the MEMS sound transducer 110 in single membrane and single backplate configuration. As shown in FIG. 2A, the MEMS sound transducer 110 has the membrane structure 111 and the counter electrode structure 113.

The layer arrangement may be positioned on a carrier substrate, as the substrate 140 shown in FIG. 1, wherein the membrane structure 111 and the counter electrode structure 113 are separated and spaced apart from one another. The counter electrode structure 113, which is generally configured to be more rigid than the deflectable membrane structure 112, is spaced apart at a distance D from the membrane structure, with the result that a capacitance $C_0$ (=MEMS capacitance=capacitance of the MEMS sound transducer 110) can form between the counter electrode structure 113 and the membrane structure 111. The non-clamped region of the membrane structure 111 (with respect to the counter electrode structure 113) is referred to as the deflectable (=displaceable) or movable region (=active region) of the membrane structure 111. A deflection $\Delta x$ of the membrane structure 111 relative to the counter electrode structure 113 can then be detected and read out as a capacitance change $\Delta C$ in order to provide a corresponding (analog or AD-converted digital) output signal $S_{out}$ of the MEMS sound transducer 110. The deflection of the membrane structure 111 is (generally) caused by an acoustic sound pressure change in the environment.

As shown in FIG. 2B, the MEMS sound transducer 110 having a dual membrane MEMS configuration (or sealed dual membrane configuration) comprises the first membrane structure 111 and a further (second) membrane structure 112 spaced apart therefrom with the counter electrode structure 113 arranged there between, wherein the counter electrode structure 113 is spaced apart each from the first and second membrane structures 111, 112. Furthermore, at least one or a plurality mechanical connection elements, e.g. pillars, 115 can be provided between the first and second membrane structures 111, 112, wherein the mechanical connection element(s) is mechanically coupled between the first and second membrane structures 111, 112 and is mechanically decoupled from the counter electrode structure 113.

In a sealed dual membrane configuration, the first and second membrane structures 111, 112 are arranged in a hermetically sealed configuration, and a cavity 114 may be formed between the first and the second membrane structure 111, 112, wherein the counter electrode structure 113 is arranged in the cavity 114, e.g. when compared to the environmental atmosphere. The sealed cavity 114 is formed as an encapsulation structure (or vacuum chamber) enclosing a low atmospheric pressure $P_{cav}$, e.g. a low internal atmospheric pressure, such as a near vacuum condition. Thus, the sealed cavity 114 may comprise a reduced low atmospheric pressure (vacuum or near vacuum) with an atmospheric pressure of about or below 3 mbar or 1 mbar. Upon a deflection of the first and second (mechanically coupled) membrane structures 111, 112 relative to the counter electrode structure 113, that deflection or displacement can in turn be read out capacitively in order to provide the output signal $S_{out}$ dependent on the deflection (gap change) with respect to the counter electrode structure 113. The deflection of the membrane structures 111, 112 is caused by an acoustic sound pressure change in the environment.

According to a further configuration of the MEMS sound transducer 110 as a MEMS microphone as shown in FIG. 2C, the MEMS sound transducer 110 may comprise a dual-counter electrode configuration (dual backplate configuration), wherein the MEMS sound transducer 110 may comprise a first counter-electrode structure 113 and a further (second) counter-electrode structure 113-1, such that the membrane structure 111 is arranged between the first and second counter electrode structures 113, 113-1.

The deflection of the membrane structure 111 is again caused by an acoustic sound pressure change in the environment.

Figure 2D:
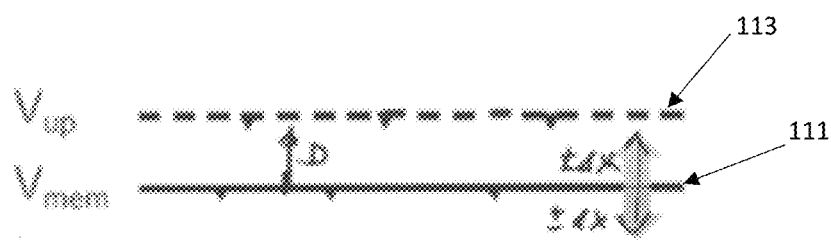

FIG. 2D shows a schematic cross-sectional view of the MEMS sound transducer 110 in single membrane and single backplate configuration. As shown in FIG. 2D, the MEMS sound transducer 110 has the membrane structure 111 and the counter electrode structure 113 arranged on top of the membrane structure 111.

The layer arrangement may be positioned on a carrier substrate, as the substrate 140 shown in FIG. 1, wherein the membrane structure 111 and the counter electrode structure 113 are separated and spaced apart from one another. The counter electrode structure 113, which is generally configured to be more rigid than the deflectable membrane structure 112, is spaced apart at a distance D from the membrane structure, with the result that a capacitance $C_0$ (=MEMS capacitance=capacitance of the MEMS sound transducer 110) can form between the counter electrode structure 113 and the membrane structure 111. The non-clamped region of the membrane structure 111 (with respect to the counter electrode structure 113) is referred to as the deflectable (=displaceable) or movable region (=active region) of the membrane structure 111. A deflection $\Delta x$ of the membrane structure 111 relative to the counter electrode structure 113 can then be detected and read out as a capacitance change $\Delta C$ in order to provide a corresponding (analog or AD-converted digital) output signal $S_{out}$ of the MEMS sound transducer 110. The deflection of the membrane structure 111 is (generally) caused by an acoustic sound pressure change in the environment.

However, it should be noted that the sound transducer 110 shown in FIGS. 2A-2C may optionally be supplemented by any of the features, functionalities and details disclosed herein, both individually or taken in combination.

Figure 3A:
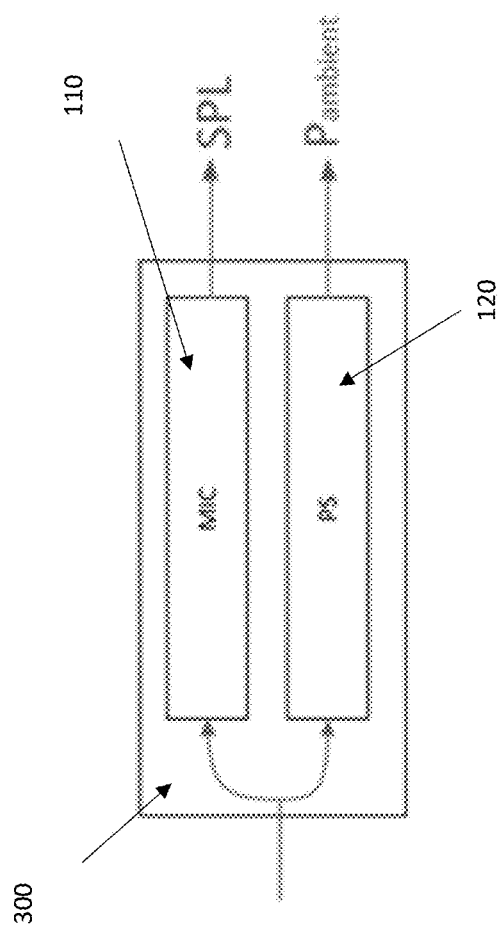
FIGS. 3A-3B show a sensor arrangement according to an embodiment and illustrate an effect of the sensor arrangement according to an embodiment.

FIG. 3A shows a combo sensor system diagram illustrating a parallel connection of the sound transducing portion 110 and the pressure sensing portion 120 of the sensor arrangement in accordance with the embodiments as described herein.

The sensor arrangement, e.g. a combo sensor, in accordance with the embodiments described herein, a sound transducing portion 110, e.g. a microphone MIC, and a pressure sensing portion 120, e.g. a pressure sensor PS, are connected in parallel. The sound transduction portion 110 measures a sound pressure level (SPL) and the pressure sensing portion 120 measure an ambient pressure $P_{ambient}$. In this configuration, the microphone 110 and the pressure sensor 120 see the pressure variations at the same time without any delay in between.

Figure 3B:
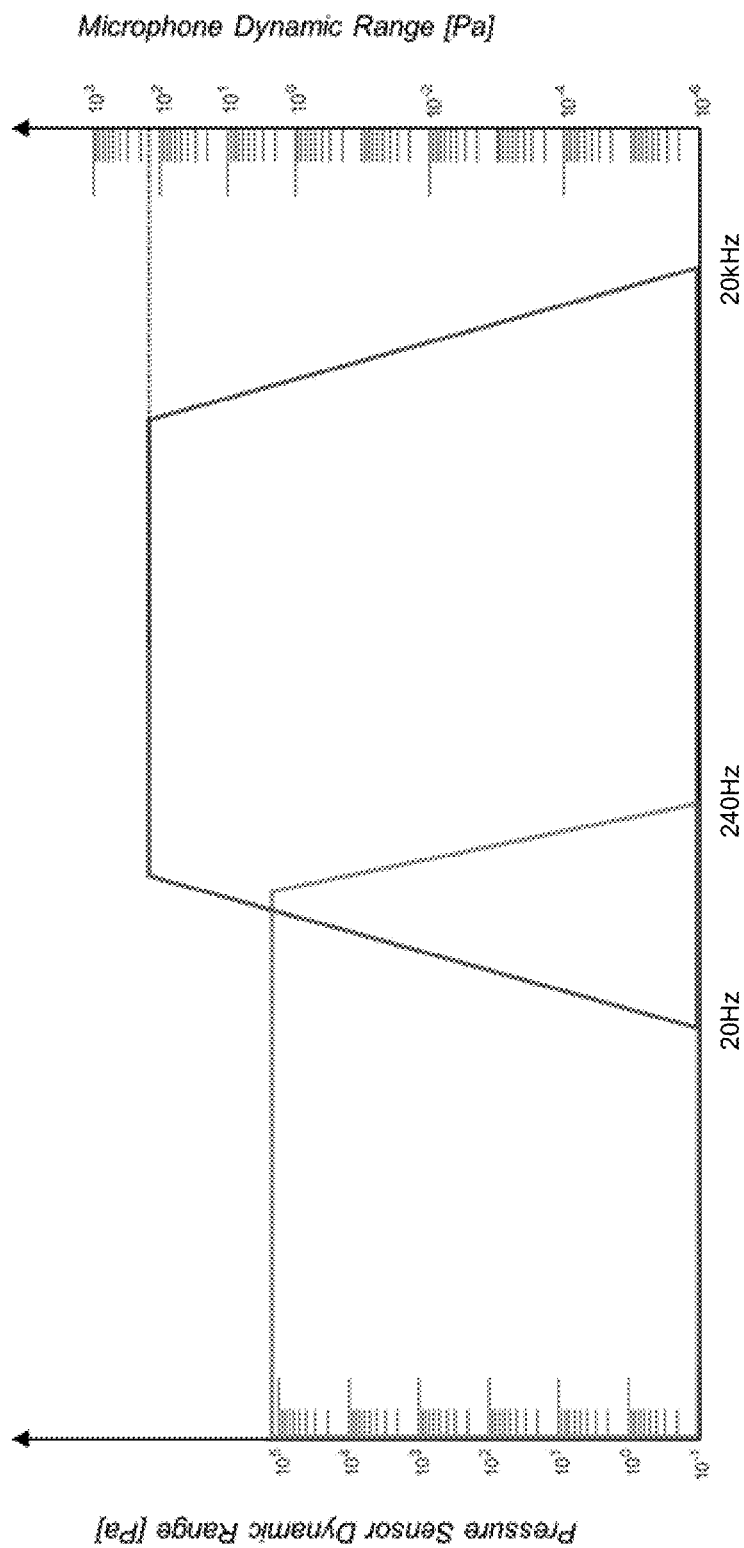

This parallel connection in accordance with the embodiments described herein, solves the problem of the limited bandwidth of the pressure sensor, which is shown in FIG. 3B.

In a possible configuration with a serial connection between the microphone and the pressure sensor, the ventilation time of the microphone defines the maximum bandwidth of the pressure sensor. There is basically a delay between the pressure variations input to the microphone and the pressure sensor. For any change of the ambient pressure, the pressure in the back volume will equalize after some time, depending on the ventilation time, which is defined by the ventilation hole size and the back volume. Essentially, the microphone membrane acts as a low pass filter for the pressure sensor, therefore limiting its bandwidth and subsequently the maximum ODR (output data rate, sampling rate), as could be seen in FIG. 3B.

In a bottom port microphone package the pressure sensor structure will sense the pressure in the back volume as defined by the package lid. For any change of the ambient pressure, the pressure in the back volume will equalize after some time, depending on the ventilation time, which is defined by the ventilation hole size and the back volume. Essentially, the microphone membrane acts as a low pass filter for the pressure sensor, therefor limiting its bandwidth, as could be seen in FIG. 3B. In the example, shown in FIG. 3B, given a microphone bandwidth of 20 Hz to 20 kHz, the pressure sensor bandwidth will be limited to ~20 Hz when most of the commercial pressure sensors can operate up to 240 Hz.

The sensor arrangement shown in FIG. 3A with the parallel connection, as well as other embodiments of the sensor arrangement 100 described herein, the sound transducing portion, e.g. microphone, 110 and the pressure sensing portion 120, e.g. the pressure sensor, see the pressure variations at the same time without any delay in between. Therefore, the sensor arrangement without bandwidth limitation of the pressure sensor is provided, thus providing an improved sensor performance.

However, it should be noted that the sensor arrangement shown in FIG. 3A may optionally be supplemented by any of the features, functionalities and details disclosed herein, both individually or taken in combination.

Figure 4:
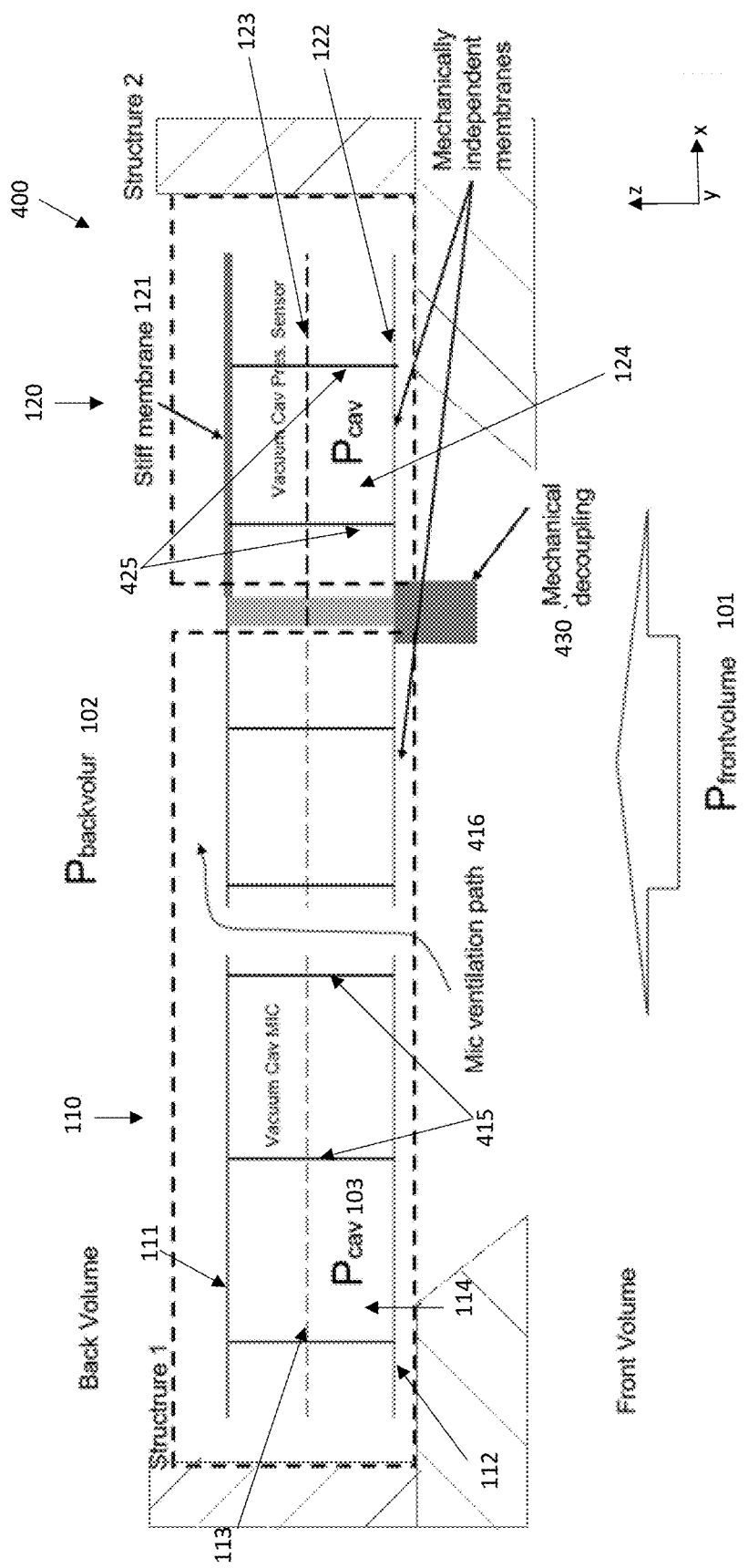
FIG. 4 shows a schematic cross-sectional view of a sensor arrangement according to an embodiment.

FIG. 4 shows a sensor arrangement 400 in accordance with an embodiment. The sensor arrangement is schematically shown in a cross-sectional view, principally showing the inner structure of the sensor arrangement.

The sensor arrangement 400, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first 141 and second 142 main surface regions.

The sensor arrangement 400 comprises a sound transducing portion 110, e.g. a sound transducer, e.g. a microphone, e.g. Structure 1, and a pressure sensing portion 120, e.g. a pressure sensor, e.g. Structure 2. The sound transducing portion 110 is arranged at the first main surface region of the substrate and at least partially (or completely) spanning the through opening in the substrate. The pressure sensing portion 120 is arranged at the first main surface region of the substrate and fluidically coupled to the through opening in the substrate.

Both the sound transducing portion 110 and the pressure sensing portion 120 comprise three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110, senses the pressure difference between the front volume 101 and the back volume 102 ($P_{frontvolume} - P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided. Alternatively, the deflectable membrane structure may be formed not only as an SDM structure, but also as a SBP (single backplate) structure, or as a DBP (dual backplate) structure, for example, when the pressure sensing part 120 is formed as an extension of a single backplate SiMic (silicon microphone).

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. The mechanical coupling through pillars prevents the sound transducing portion 110 from deformation during the operation. The more stable construction of the sound transducing portion 110 is thus provided. At the same time, the deflectable portions of the first and second membrane elements 111, 112 are mechanically decoupled from the counter electrode 113.

A ventilation path 416, e.g. Microphone ventilation path, is provided in the sound transducing portion 110. The ventilation path 416 fluidically connects the front volume and the back volume.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate.

The first rigid electrode 121, e.g. a stiff membrane, makes the pressure sensing portion 120 insensitive to the pressure variations of the back volume. The pressure sensing portion 120 senses the pressure difference between the front volume and a vacuum cavity 124 between the first rigid electrode 121 and the deflectable membrane structure 122 of the pressure sensing portion 120 ($P_{frontvolume} - P_{cavity}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The deflectable membrane structure 122 of the pressure sensing portion 120 comprises a deflectable portion. The deflectable portion of the deflectable membrane structure 122 is mechanically coupled through pillars 425 to the first rigid electrode 121 and mechanically decoupled from the second rigid electrode 123. The pillars prevent the pressure sensing portion from deformation during the operation. In an alternative embodiment, the deflectable portion of the deflectable membrane structure 122 of the pressure sensing portion 120 is mechanically decoupled from the first rigid electrode 121 and from the second rigid electrode 123. In such alternative embodiment the pressure sensing portion 120 comprises no pillars 425. In this embodiment, an improved sensitivity of the membrane structure is provided due to an increased area of deflection, e.g. since pillars connecting the first rigid electrode and the deflectable portion of the membrane structure are eliminated completely.

The first deflectable membrane element 111 of the sound transducing portion 110 and the first rigid electrode 121 of the pressure sensing portion 120 are arranged in the same plane with respect to the first main surface region of the substrate. The counter electrode 113 of the sound transducing portion 110 and the second rigid electrode 123 of the pressure sensing portion 120 are arranged in the same plane with respect to the first main surface region of the substrate. The second deflectable membrane element 112 of the sound transducing portion 110 and the deflectable membrane structure 122 of the pressure sensing portion 120 are arranged in the same plane with respect to the first main surface region of the substrate.

The sensor arrangement 400 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region of the substrate. The mechanical decoupling structure enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 partially (or completely) spans the through opening in the substrate. This embodiment provides a parallel fluidical connection between the sound transducing portion and the pressure sensing portion.

In the sensor arrangement 400 shown in FIG. 4 no additional area is required for the reference capacitors of the pressure sensing portion 120, e.g. the absolute pressure sensor, while maintaining a high sensor signal. This is provided due to the configuration, where the first and second rigid electrodes 121, 123 of the pressure sensing portion 120 form a reference capacitor and the second rigid electrode 123 and the deflectable membrane structure 122 of the pressure sensing portion 120 form a sense capacitor in a stacked configuration, e.g. in a vertically spaced and separated configuration.

The sense, e.g. sensor, capacitor and the corresponding membrane, e.g. the deflectable membrane structure 122 are directly facing the back volume in this embodiment. The sound transducing portion 110 and the pressure sensing portion 120 are fluidically connected in parallel. This parallel connection between the sound transducing portion 110 and the pressure sensing portion 120 is also schematically shown in FIG. 3A. This parallel connection solves the issue with the limited bandwidth of the pressure sensor in the sensor arrangement.

In an embodiment, the sensor arrangement 400 is formed as a single chip, e.g. as a MEMS chip.

The sensor arrangement 400 described above could be a part of a portable electronic device, e.g. a smartphone.

However, it should be noted that the sensor arrangement 400 may optionally be supplemented by any of the features, functionalities and details disclosed herein, both individually or taken in combination.

Figure 5:
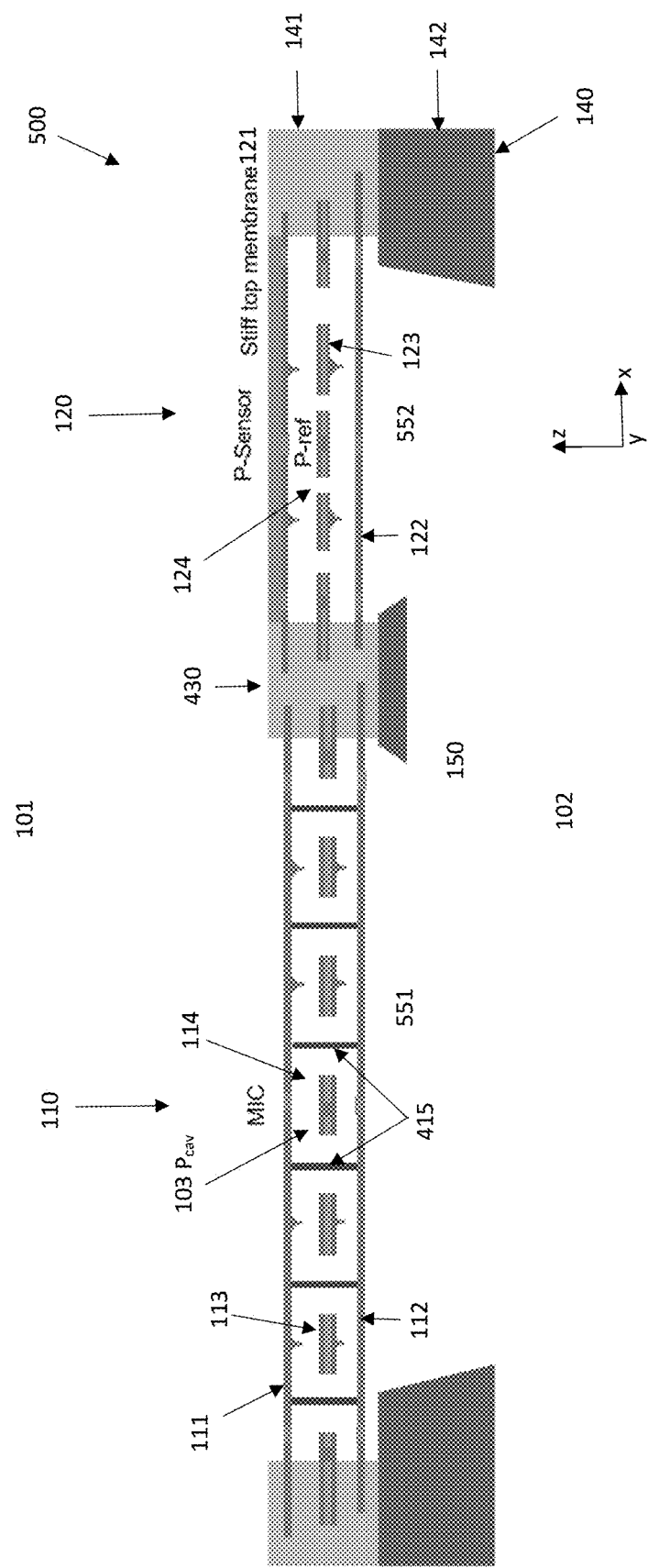
FIG. 5 shows a schematic cross-sectional view of a sensor arrangement according to an embodiment.

FIG. 5 shows a sensor arrangement 500 in accordance with an embodiment. The sensor arrangement is schematically shown in a cross-sectional view, principally showing the inner structure of the sensor arrangement.

The sensor arrangement 500, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first and second main surface regions.

The sensor arrangement 500 comprises a sound transducing portion 110, e.g. a sound transducer, e.g. a microphone, and a pressure sensing portion 120, e.g. a pressure sensor. The sound transducing portion 110 is arranged at the first main surface region 141 of the substrate 140 and at least partially (or completely) spanning the through opening 150 in the substrate 140. The pressure sensing portion 120 is arranged at the first main surface region 141 of the substrate 140 and fluidically coupled to the through opening 150 in the substrate 140.

Both the sound transducing portion 110 and the pressure sensing portion 120 comprises three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110 senses the pressure difference between the front volume 101 and the back volume 102 ($P_{frontvolume} - P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided.

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. The mechanical coupling through pillars prevents the sound transducing portion 110 from deformation during the operation. The more stable construction of the sound transducing portion 110 is thus provided. At the same time, the deflectable portions of the first and second membrane elements 111, 112 are mechanically decoupled from the counter electrode 113.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate. The first rigid electrode 121 is a top poly-Si membrane, which is stiffened.

The first rigid electrode 121, e.g. a stiff membrane, makes the pressure sensing portion 120 insensitive to the pressure variations of the back volume 102. The pressure sensing portion 120 senses the pressure difference between the front volume 101 and a vacuum cavity 124 between the first rigid electrode 121 and the deflectable membrane structure 122 of the pressure sensing portion 120 ($P_{frontvolume}-P_{cavity}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The deflectable membrane structure 122 of the pressure sensing portion 120 comprises a deflectable portion. The deflectable portion of the deflectable membrane structure 122 of the pressure sensing portion 120 is mechanically decoupled from the first rigid electrode 121 and from the second rigid electrode 123. In this embodiment, an improved sensitivity of the membrane structure is provided due to an increased area of deflection.

The first deflectable membrane element 111 of the sound transducing portion 110 and the first rigid electrode 121 of the pressure sensing portion 120 are arranged in the same plane with respect to the first main surface region 141 of the substrate 140. The counter electrode 113 of the sound transducing portion 110 and the second rigid electrode 123 of the pressure sensing portion 120 are arranged in the same plane with respect to the first main surface region 141 of the substrate 140. The second deflectable membrane element 112 of the sound transducing portion 110 and the deflectable membrane structure 122 of the pressure sensing portion 120 are arranged in the same plane with respect to the first main surface region 141 of the substrate 140.

The sensor arrangement 500 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region 141 of the substrate 140. The mechanical decoupling structure enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 partially (or completely) spans the through opening 150 in the substrate 140. The through opening 150, e.g. cavity, e.g. a so-called Bosch cavity, comprises a first through opening portion 551, e.g. a so-called Bosch cavity, and a second through opening portion 552, e.g. a so-called Bosch cavity. The first through opening portion 551 is associated to the sound transducing portion 101 spanning at least partially (or completely) the first through opening portion 551. The second through opening portion 552 is associated with the pressure sensing portion 120 spanning at least partially (or completely) the second through opening portion 552. In an embodiment, the through opening 150 comprising the first through opening portion 551 and the second through opening portion 552 is etched in one or more steps, e.g. in two steps, to receive Bosch cavities. This results in a formation of the rigid mechanical connection—the mechanical decoupling structure 430—between the sound transducing portion 110, e.g. the microphone, and the pressure sensing portion 120, e.g. the pressure sensor, that provides sufficient decoupling between the membranes of the sound transducing portion 110 and the pressure sensing portion 120 and to implement the release of the pressure sensor structure.

In this embodiment, the pressure sensing portion 120 is thus released due to the Bosch cavities etched in one or more steps, e.g. in two steps. The sense, e.g. sensor, capacitor and the corresponding membrane, e.g. the deflectable membrane structure 122 are directly facing the back volume in this embodiment. The sound transducing portion 110 and the pressure sensing portion 120 are fluidically connected in parallel. This parallel connection solves the issue with the limited bandwidth of the pressure sensor in the sensor arrangement.

In the sensor arrangement 500 shown in FIG. 5 no additional area is required for the reference capacitors of the pressure sensing portion 120, e.g. the absolute pressure sensor, while maintaining a high sensor signal. This is provided due to the configuration, where the first and second rigid electrodes 121, 123 of the pressure sensing portion 120 form a reference capacitor and the second rigid electrode 123 and the deflectable membrane structure 122 of the pressure sensing portion 120 form a sense capacitor in a stacked configuration, e.g. in a vertically spaced and separated configuration.

In an embodiment, the sensor arrangement 500 is formed as a single chip, e.g. as a MEMS chip.

The sensor arrangement 500 described above could be a part of a portable electronic device, e.g. a smartphone.

However, it should be noted that the sensor arrangement 500 may optionally be supplemented by any of the features, functionalities and details disclosed herein, both individually or taken in combination.

Figure 6:
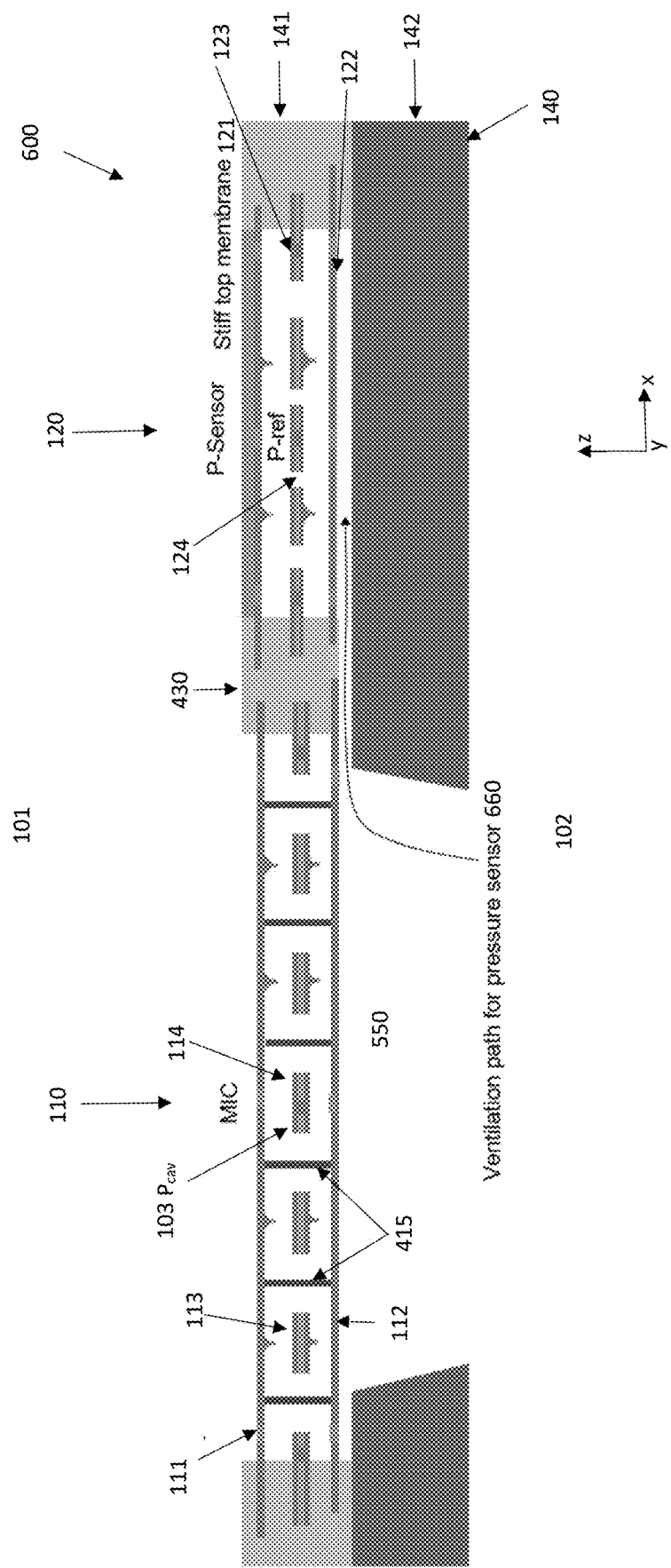
FIG. 6 shows a schematic cross-sectional view of a sensor arrangement according to an embodiment.

FIG. 6 shows a sensor arrangement 600 in accordance with an embodiment. The sensor arrangement is schematically shown in a cross-sectional view, principally showing the inner structure of the sensor arrangement.

The sensor arrangement 600, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first and second main surface regions.

The sensor arrangement 600 comprises a sound transducing portion 110, e.g. a sound transducer, e.g. a microphone, and a pressure sensing portion 120, e.g. a pressure sensor. The sound transducing portion 110 is arranged at the first main surface region 141 of the substrate 140 and at least partially (or completely) spanning the through opening 150 in the substrate 140. This embodiment provides a parallel fluidical connection between the sound transducing portion and the pressure sensing portion.

The pressure sensing portion 120 is arranged at the first main surface region 141 of the substrate 140 and fluidically coupled to the through opening 150 in the substrate 140.

Both the sound transducing portion 110 and the pressure sensing portion 120 comprises three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110 senses the pressure difference between the front volume 101 and the back volume 102 ($P_{frontvolume} - P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided.

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. The mechanical coupling through pillars prevents the sound transducing portion 110 from deformation during the operation. The more stable construction of the sound transducing portion 110 is thus provided. At the same time, the deflectable portions of the first and second membrane elements 111, 112 are mechanically decoupled from the counter electrode 113.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate. The first rigid electrode 121 is a top poly-Si membrane, which is stiffened.

The first rigid electrode 121, e.g. a stiff membrane, makes the pressure sensing portion 120 insensitive to the pressure variations of the back volume 102. The pressure sensing portion 120 senses the pressure difference between the front volume 101 and a vacuum cavity 124 between the first rigid electrode 121 and the deflectable membrane structure 122 of the pressure sensing portion 120 ($P_{frontvolume} - P_{cavity}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically stacked and separated from the sense capacitor. The reference capacitor and the sense capacitor share the same middle electrode, namely a second rigid electrode 123, e.g. a stator. Due to these two capacitors sharing the same middle electrode, an area consumption is decreased.

The deflectable membrane structure 122 of the pressure sensing portion 120 comprises a deflectable portion. The deflectable portion of the deflectable membrane structure 122 of the pressure sensing portion 120 is mechanically decoupled from the first rigid electrode 121 and from the second rigid electrode 123. In this embodiment, an improved sensitivity of the membrane structure is provided due to an increased area of deflection.

The first deflectable membrane element 111 of the sound transducing portion 110 and the first rigid electrode 121 of the pressure sensing portion 120 are arranged in the same plane with respect to the first main surface region 141 of the substrate 140. The counter electrode 113 of the sound transducing portion 110 and the second rigid electrode 123 of the pressure sensing portion 120 are arranged in the same plane with respect to the first main surface region 141 of the substrate 140. The second deflectable membrane element 112 of the sound transducing portion 110 and the deflectable membrane structure 122 of the pressure sensing portion 120 are arranged in the same plane with respect to the first main surface region 141 of the substrate 140.

The sensor arrangement 600 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region 141 of the substrate 140. The mechanical decoupling structure enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 is fluidically connected to the through opening 150 in the substrate 140 by means of a ventilation channel 660, e.g. a direct ventilation path. In this embodiment, the through opening associated with the sound transducing portion 110 is a so-called Bosch cavity received by etching as in the embodiment shown in FIG. 5. An etching channel—the ventilation channel 660—is used in order to release the pressure sensor structure and then is used as a ventilation path for the pressure sensing portion 120, e.g. an absolute pressure sensor. The sound transducing portion 110 and the pressure sensing portion 120 are fluidically connected in parallel in this embodiment due to the ventilation channel 660. The ventilation channel releases the pressure sensing portion, providing a parallel fluidical connection between the sound transducing portion and the pressure sensing portion.

In alternative embodiments, more than one ventilation channel 660 may be provided.

In the sensor arrangement 600 shown in FIG. 5 no additional area is required for the reference capacitors of the pressure sensing portion 120, e.g. the absolute pressure sensor, while maintaining a high sensor signal. This is provided due to the configuration, where the first and second rigid electrodes 121, 123 of the pressure sensing portion 120 form a reference capacitor and the second rigid electrode 123 and the deflectable membrane structure 122 of the pressure sensing portion 120 form a sense capacitor in a stacked configuration, e.g. in a vertically spaced and separated configuration.

In an embodiment, the sensor arrangement 600 is formed as a single chip, e.g. as a MEMS chip.

The sensor arrangement 600 described above could be a part of a portable electronic device, e.g. a smartphone.

However, it should be noted that the sensor arrangement 600 may optionally be supplemented by any of the features, functionalities and details disclosed herein, both individually or taken in combination.

Figure 7:
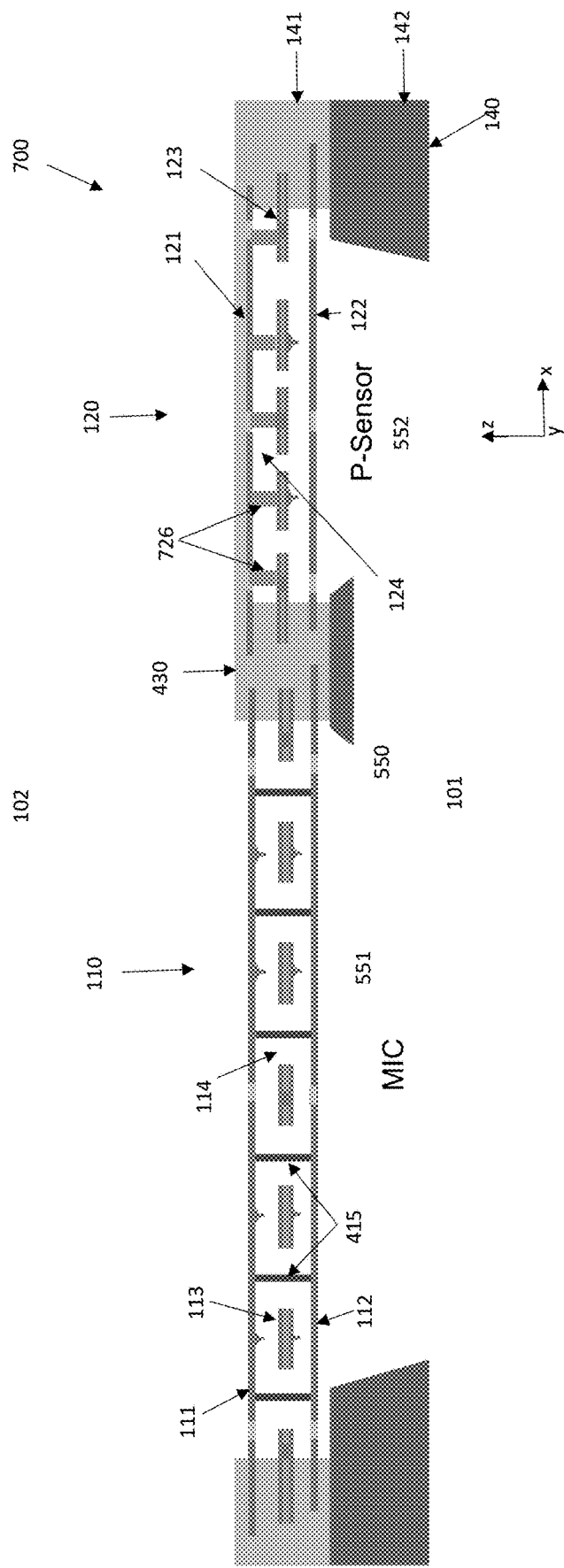
FIG. 7 shows a schematic cross-sectional view of a sensor arrangement according to an embodiment.

FIG. 7 shows a sensor arrangement 700 in accordance with an embodiment. The sensor arrangement is schematically shown in a cross-sectional view, principally showing the inner structure of the sensor arrangement.

The sensor arrangement 700, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first and second main surface regions.

The sensor arrangement 700 comprises a sound transducing portion 110, e.g. a sound transducer, e.g. a microphone, and a pressure sensing portion 120, e.g. a pressure sensor. The sound transducing portion 110 is arranged at the first main surface region 141 of the substrate 140 and at least partially (or completely) spanning the through opening 150 in the substrate 140. This embodiment provides a parallel fluidical connection between the sound transducing portion and the pressure sensing portion. The pressure sensing portion 120 is arranged at the first main surface region 141 of the substrate 140 and fluidically coupled to the through opening 150 in the substrate 140.

Both the sound transducing portion 110 and the pressure sensing portion 120 comprises three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110 senses the pressure difference between the front volume 101 and the back volume 102 ($P_{frontvolume} - P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided.

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. The mechanical coupling through pillars prevents the sound transducing portion 110 from deformation during the operation. The more stable construction of the sound transducing portion 110 is thus provided. At the same time, the deflectable portions of the first and second membrane elements 111, 112 are mechanically decoupled from the counter electrode 113.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate. The first rigid electrode 121 is a top poly-Si membrane, which is stiffened, in an embodiment.

The first rigid electrode 121, e.g. a stiff membrane, makes the pressure sensing portion 120 insensitive to the pressure variations of the back volume 102. The pressure sensing portion 120 senses the pressure difference between the front volume 101 and a vacuum cavity 124 between the first rigid electrode 121 and the deflectable membrane structure 122 of the pressure sensing portion 120 ($P_{frontvolume} - P_{cavity}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The first rigid electrode 121 of the pressure sensing portion 120 is mechanically coupled through pillars 726 to the second rigid electrode 123 of the pressure sensing portion 120. The reference capacitor top electrode is thus further stiffened, e.g. by pillars connecting to the stator, improving an insensitiveness of the pressure sensing portion to the pressure variation of the back volume.

The deflectable membrane structure 122 of the pressure sensing portion 120 comprises a deflectable portion. The deflectable portion of the deflectable membrane structure 122 of the pressure sensing portion 120 is mechanically decoupled from the first rigid electrode 121 and from the second rigid electrode 123. In this embodiment, an improved sensitivity of the membrane structure is provided due to an increased area of deflection.

The first deflectable membrane element 111 of the sound transducing portion 110 and the first rigid electrode 121 of the pressure sensing portion 120 are arranged in the same plane with respect to the first main surface region 141 of the substrate 140. The counter electrode 113 of the sound transducing portion 110 and the second rigid electrode 123 of the pressure sensing portion 120 are arranged in the same plane with respect to the first main surface region 141 of the substrate 140. The second deflectable membrane element 112 of the sound transducing portion 110 and the deflectable membrane structure 122 of the pressure sensing portion 120 are arranged in the same plane with respect to the first main surface region 141 of the substrate 140.

The sensor arrangement 700 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region 141 of the substrate 140. The mechanical decoupling structure 430 enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 partially (or completely) spans the through opening 150 in the substrate 140. The through opening 150, e.g. cavity, e.g. a so-called Bosch cavity, comprises a first through opening portion 551, e.g. a so-called Bosch cavity, and a second through opening portion 552, e.g. a so-called Bosch cavity. The first through opening portion 551 is associated to the sound transducing portion 101 spanning at least partially (or completely) the first through opening portion 551. The second through opening portion 552 is associated with the pressure sensing portion 120 spanning at least partially (or completely) the second through opening portion 552. In an embodiment, the through opening 150 comprising the first through opening portion 551 and the second through opening portion 552 is etched in one or more steps, e.g. in two steps, to receive Bosch cavities. This results in a formation of the rigid mechanical connection—the mechanical decoupling structure 430—between the sound transducing portion 110, e.g. the microphone, and the pressure sensing portion 120, e.g. the pressure sensor, that provides sufficient decoupling between the membranes of the sound transducing portion 110 and the pressure sensing portion 120 and to implement the release of the pressure sensor structure.

In this embodiment, the pressure sensing portion 120 is thus released due to the Bosch cavities etched in one or more steps, e.g. in two steps. The sense, e.g. sensor, capacitor and the corresponding membrane, e.g. the deflectable membrane structure 122 are directly facing the back volume in this embodiment. The sound transducing portion 110 and the pressure sensing portion 120 are fluidically connected in parallel. This parallel connection solves the issue with the limited bandwidth of the pressure sensor in the sensor arrangements.

In the sensor arrangement 700 shown in FIG. 7 no additional area is required for the reference capacitors of the pressure sensing portion 120, e.g. the absolute pressure sensor, while maintaining a high sensor signal. This is provided due to the configuration, where the first and second rigid electrodes 121, 123 of the pressure sensing portion 120 form a reference capacitor and the second rigid electrode 123 and the deflectable membrane structure 122 of the pressure sensing portion 120 form a sense capacitor in a stacked configuration, e.g. in a vertically spaced and separated configuration.

In this embodiment the reference capacitor top electrode—the first rigid electrode 121—is further stiffened by the pillars 726 connecting the first rigid electrode 121 to the second rigid electrode 123, e.g. the stator.

In an embodiment, the sensor arrangement 700 is formed as a single chip, e.g. as a MEMS chip.

The sensor arrangement 700 described above could be a part of a portable electronic device, e.g. a smartphone.

However, it should be noted that the sensor arrangement 700 may optionally be supplemented by any of the features, functionalities and details disclosed herein, both individually or taken in combination.

Figure 8:
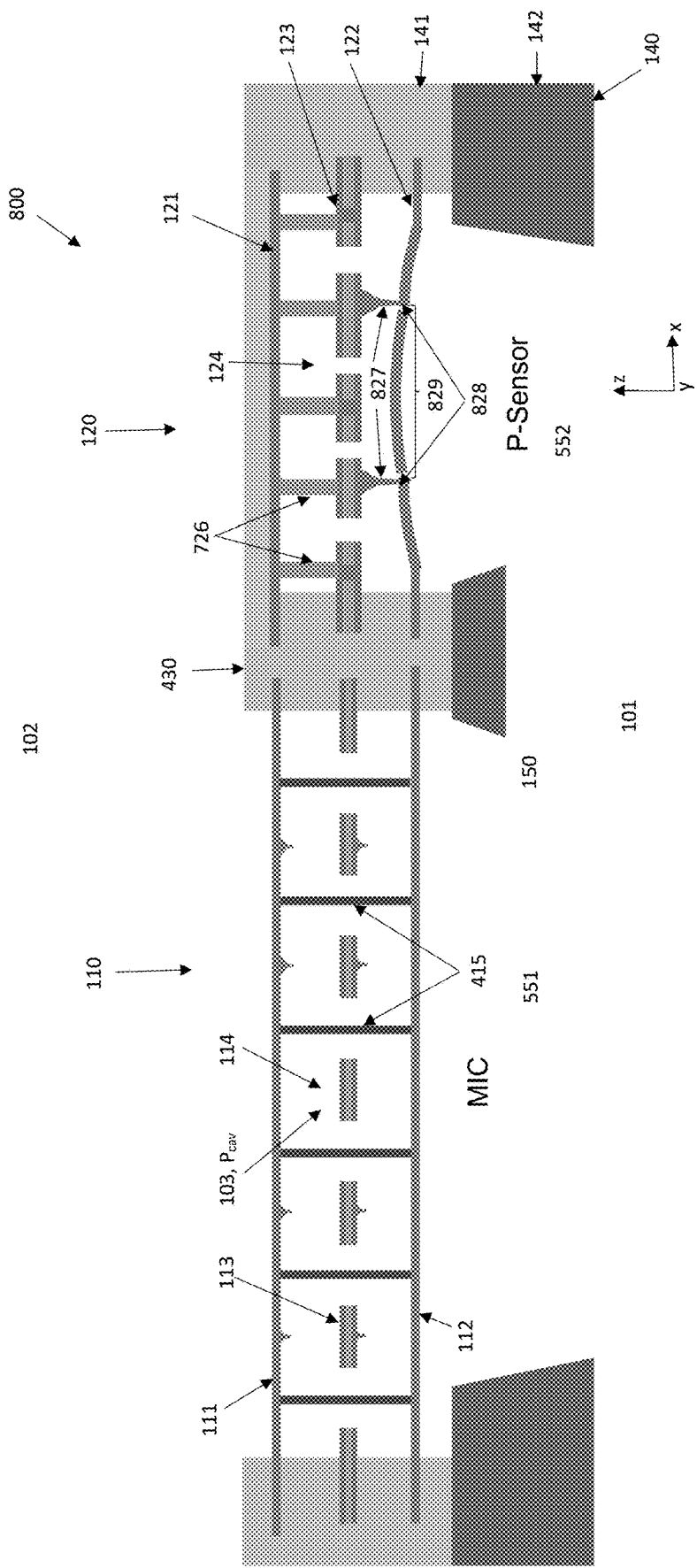
FIG. 8 shows a schematic cross-sectional view of a sensor arrangement according to an embodiment.

FIG. 8 shows a sensor arrangement 800 in accordance with an embodiment. The sensor arrangement is schematically shown in a cross-sectional view, principally showing the inner structure of the sensor arrangement.

The sensor arrangement 800, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first and second main surface regions.

The sensor arrangement 800 comprises a sound transducing portion 110, e.g. a sound transducer, e.g. a microphone, and a pressure sensing portion 120, e.g. a pressure sensor. The sound transducing portion 110 is arranged at the first main surface region 141 of the substrate 140 and at least partially (or completely) spanning the through opening 150 in the substrate 140. The pressure sensing portion 120 is arranged at the first main surface region 141 of the substrate 140 and fluidically coupled to the through opening 150 in the substrate 140.

Both the sound transducing portion 110 and the pressure sensing portion 120 comprises three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110 senses the pressure difference between the front volume 101 and the back volume 102 ($P_{frontvolume}-P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided.

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. At the same time, the deflectable portions of the first and second membrane elements 111, 112 are mechanically decoupled from the counter electrode 113.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate. The first rigid electrode 121 is a top poly-Si membrane, which is stiffened, in an embodiment.

The first rigid electrode 121, e.g. a stiff membrane, makes the pressure sensing portion 120 insensitive to the pressure variations of the back volume 102. The pressure sensing portion 120 senses the pressure difference between the front volume 101 and a vacuum cavity 124 between the first rigid electrode 121 and the deflectable membrane structure 122 of the pressure sensing portion 120 ($P_{frontvolume}-P_{cavity}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The first rigid electrode 121 of the pressure sensing portion 120 is mechanically coupled through pillars, 726 to the second rigid electrode 123 of the pressure sensing portion 120. The reference capacitor top electrode is thus further stiffened, e.g. by pillars connecting to the stator, improving an insensitiveness of the pressure sensing portion to the pressure variation of the back volume.

A plurality of first bumps 827 is arranged between the second rigid electrode 123 and the deflectable membrane structure 122. The plurality of first bumps 827 is positioned to form bearing points, e.g. fixing points, 828 between the deflectable membrane structure 122 and the second rigid electrode, e.g. spacers between the deflectable membrane structure 122 and the second rigid electrode 123. A continuous free space between the bearing points 828 defines the deflectable portion 829 of the deflectable membrane structure 122, e.g. the deflectable portion 829 is the spanned region without the bearing points 828.

The deflectable membrane structure 122 and the second rigid electrode 123 are coupled through the plurality of bumps 827, so that the deflectable membrane structure 122 is pressed in a direction to the second rigid electrode, e.g. the deflectable portion 829 being pressed to the plurality of bumps 827 to contact the plurality of bumps 827. The deflectable portion 829 of the deflectable membrane structure 122 is limited by a line of the bumps placement. This embodiment provides a decreased effective gap of the sensor capacitor of the pressure sensing portion, which leads to an improved sensitivity over area.

In the embodiment shown in FIG. 8, the plurality of bumps 827 is fixed, e.g. glued, to a below side of the second rigid electrode and extending from the second rigid electrode 123 in a direction to the deflectable membrane structure 122. The deflectable membrane structure 122 is not mechanically fixed, e.g. glued, to the second rigid electrode 123, e.g. stator. An action of the pressure ensures contact of the deflectable membrane structure 122 to the plurality of bumps 827. The deflectable membrane structure 122 is pressed to the plurality of bumps 827 to provide the contact between them. The plurality of bumps 827 become a mechanical fix point, or mechanical fix points, of the deflectable membrane structure 122, which prevents a translational movement of the deflectable membrane structure 122. This provides the smaller effective gap, e.g. gap between plates of the sense capacitor, defined by the bumps height, which provides higher sensitivity over the area.

In an alternative embodiment, the plurality of bumps 827 may be fixed, e.g. glued, to an upper side of the deflectable membrane structure 122 and extending from the deflectable membrane structure 122 in a direction to the second rigid electrode 123. An action of the pressure ensures contact of the plurality of bumps 827 fixed on the deflectable membrane structure 122 to the second rigid electrode 123. The deflectable membrane structure 122 with the bumps is pressed to the second rigid electrode 123 to provide the contact between the bumps 827 and the second rigid electrode 123. This prevents a translational movement of the deflectable membrane structure 12.

The first deflectable membrane element 111 of the sound transducing portion 110 and the first rigid electrode 121 of the pressure sensing portion 120 are arranged in the same plane with respect to the first main surface region 141 of the substrate 140. The counter electrode 113 of the sound transducing portion 110 and the second rigid electrode 123 of the pressure sensing portion 120 are arranged in the same plane with respect to the first main surface region 141 of the substrate 140. The second deflectable membrane element 112 of the sound transducing portion 110 and the deflectable membrane structure 122 of the pressure sensing portion 120 are arranged in the same plane with respect to the first main surface region 141 of the substrate 140.

The sensor arrangement 800 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region 141 of the substrate 140. The mechanical decoupling structure 430 enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 partially (or completely) spans the through opening 150 in the substrate 140. The through opening 150, e.g. cavity, e.g. a so-called Bosch cavity, comprises a first through opening portion 551, e.g. a so-called Bosch cavity, and a second through opening portion 552, e.g. a so-called Bosch cavity. The first through opening portion 551 is associated to the sound transducing portion 101 spanning at least partially (or completely) the first through opening portion 551. The second through opening portion 552 is associated with the pressure sensing portion 120 spanning at least partially (or completely) the second through opening portion 552. In an embodiment, the through opening 150 comprising the first through opening portion 551 and the second through opening portion 552 is etched in one or more steps, e.g. in two steps, to receive Bosch cavities. This results in a formation of the rigid mechanical connection—the mechanical decoupling structure 430—between the sound transducing portion 110, e.g. the microphone, and the pressure sensing portion 120, e.g. the pressure sensor, that provides sufficient decoupling between the membranes of the sound transducing portion 110 and the pressure sensing portion 120 and to implement the release of the pressure sensor structure.

In this embodiment, the pressure sensing portion 120 is thus released due to the Bosch cavities etched in one or more steps, e.g. in two steps. The sense, e.g. sensor, capacitor and the corresponding membrane, e.g. the deflectable membrane structure 122 are directly facing the back volume in this embodiment. The sound transducing portion 110 and the pressure sensing portion 120 are fluidically connected in parallel. This parallel connection solves the issue with the limited bandwidth of the pressure sensor in the sensor arrangements.

In the sensor arrangement 800 shown in FIG. 8 an improved sensitivity of the pressure sensing portion 120 is provided due to the smaller effective gap of the sense capacitor, defined by the bumps height.

In an embodiment, the sensor arrangement 800 is formed as a single chip, e.g. as a MEMS chip.

The sensor arrangement 800 described above could be a part of a portable electronic device, e.g. a smartphone.

However, it should be noted that the sensor arrangement 800 may optionally be supplemented by any of the features, functionalities and details disclosed herein, both individually or taken in combination.

Figure 9:
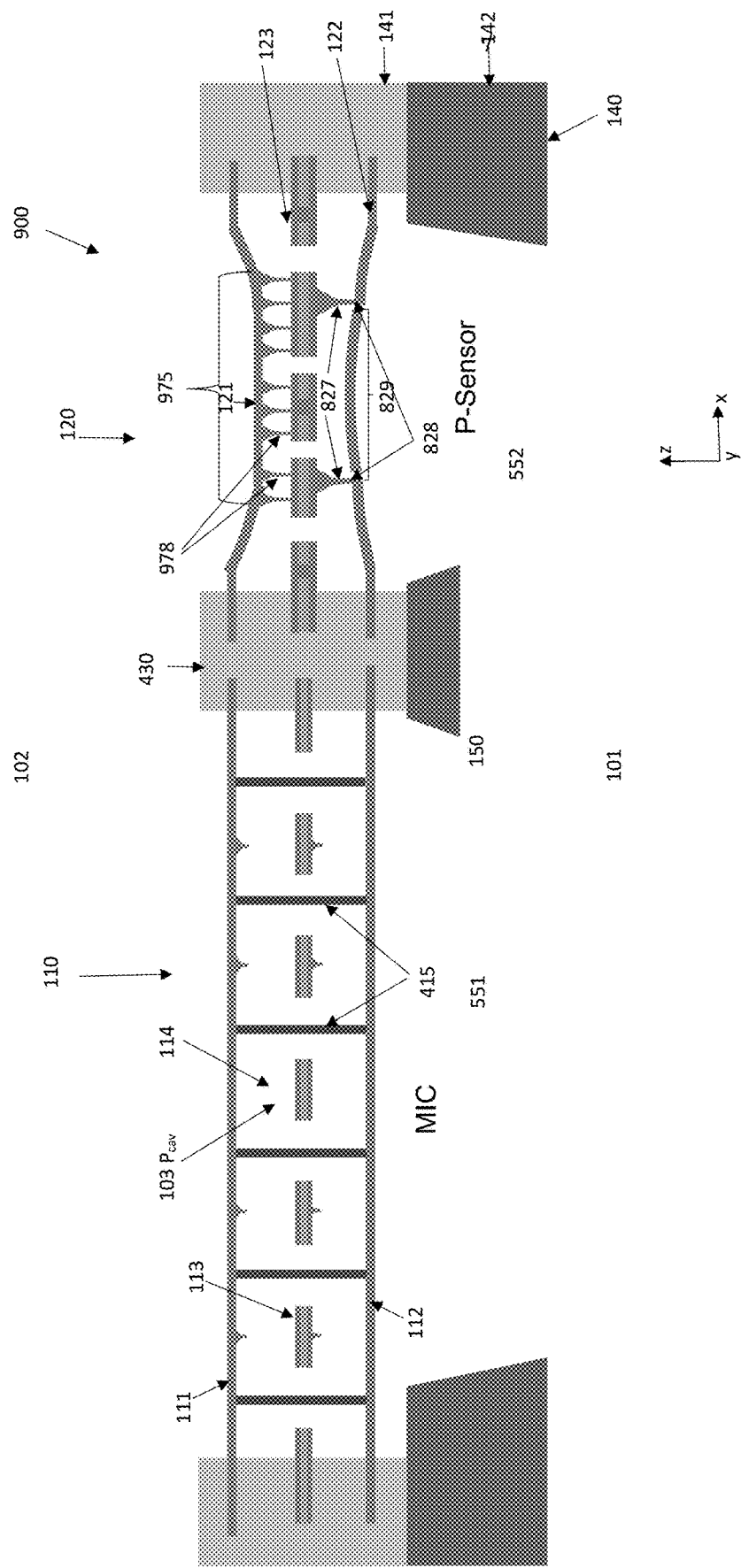
FIG. 9 shows a schematic cross-sectional view of a sensor arrangement according to an embodiment.

FIG. 9 shows a sensor arrangement goo in accordance with an embodiment. The sensor arrangement is schematically shown in a cross-sectional view, principally showing the inner structure of the sensor arrangement.

The sensor arrangement 900, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first and second main surface regions.

The sensor arrangement 900 comprises a sound transducing portion 110, e.g. a sound transducer, e.g. a microphone, and a pressure sensing portion 120, e.g. a pressure sensor. The sound transducing portion 110 is arranged at the first main surface region 141 of the substrate 140 and at least partially (or completely) spanning the through opening 150 in the substrate 140. The pressure sensing portion 120 is arranged at the first main surface region 141 of the substrate 140 and fluidically coupled to the through opening 150 in the substrate 140.

Both the sound transducing portion 110 and the pressure sensing portion 120 comprises three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110 senses the pressure difference between the front volume 101 and the back volume 102 ($P_{frontvolume} - P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided.

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. At the same time, the deflectable portions of the first and second membrane elements 111, 112 are mechanically decoupled from the counter electrode 113.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate.

A plurality of second bumps 978 is arranged between the first rigid electrode 121 and the second rigid electrode 123. The plurality of second bumps 978 is positioned to form a region 975 of the first rigid electrode 121 with a fixed spacing, which is equal to the height of the second bumps 978, between the first and the second rigid electrode. The region 975 with the fixed spacing is formed due to the reduced atmospheric pressure in the vacuum cavity 124 between the first and second rigid electrodes 121, 123 when compared to the ambient atmospheric pressure.

The first rigid electrode 121 may comprise a (vertically) deflectable (flexible) layer or layer structure, which is brought by means of the reduced atmospheric pressure in the vacuum cavity 124 in a deflected position towards the second rigid electrode 123 and which is held by means of plurality of second bumps 978 at least in the region 975 in the fixed spacing to the second rigid electrode 123. Thus, the first rigid electrode 121 is brought and maintained in a rigid condition with respect to the second rigid electrode 123. Therefore, the first rigid electrode 121 of FIG. 9 is also referred to as a "rigid" electrode, even if the first rigid electrode 121 may be formed as or may comprise a vertically deflectable layer (structure).

The first rigid electrode 121 is coupled to the second rigid electrode 123 through a plurality of bumps 978 arranged between the first rigid electrode 121 and the second rigid electrode 123, so that the first rigid electrode 121 is pressed in a direction to the second rigid electrode 123. A density of the bumps 978 in the plurality of bumps 978, e.g. denser positioning of the bumps 978, is chosen to stiffen the first rigid electrode 121. By choosing denser positioning of the bumps 978 in the plurality of bumps 978, the sensitivity to the top volume can be reduced significantly.

In the embodiment shown in FIG. 9, the plurality of bumps 978 is fixed, e.g. glued, to a below side of the first rigid electrode 121 and extending from the first rigid electrode 121 in a direction to the second rigid electrode 123. The second rigid electrode 123 is not mechanically fixed, e.g. glued, to the first rigid electrode 121. An action of the pressure ensures contact of the second rigid electrode 123 to the plurality of bumps 978. The first rigid electrode 121 is pressed in the direction to the second rigid electrode 123 to provide the contact between the plurality of bumps 978 and the second rigid electrode 123. The plurality of bumps 978 become a mechanical fix point, or mechanical fix points, of the second rigid electrode 123 and prevents a translational movement of the first rigid electrode 121 under the pressure variation.

In an alternative embodiment, the plurality of bumps 978 may be fixed, e.g. glued, to an upper side of the second rigid electrode 123 and extending from the second rigid electrode 123 in a direction to the first rigid electrode 123. An action of the pressure ensures contact of the plurality of bumps 978 fixed on the second rigid electrode 123 to the first rigid electrode 121. The first rigid electrode 121 is pressed in a direction to the second rigid electrode 123 to provide the contact between the bumps 978 and the first rigid electrode 121. This prevents a translational movement of the first rigid electrode 121.

A plurality of first bumps 827 is arranged between the second rigid electrode 123 and the deflectable membrane structure 122. The plurality of first bumps 827 is positioned to form bearing points, e.g. fixing points, 828 between the deflectable membrane structure 122 and the second rigid electrode, e.g. spacers between the deflectable membrane structure 122 and the second rigid electrode 123. A continuous free space between the bearing points 828 defines the deflectable portion 829 of the deflectable membrane structure 122, e.g. the deflectable portion 829 is the spanned region without the bearing points 828.

The deflectable membrane structure 122 and the second rigid electrode 123 are coupled through the plurality of bumps 827, e.g. the deflectable membrane structure 122 being pressed in a direction to the second rigid electrode 123 to contact the plurality of bumps 827. The deflectable portion 829 is limited by a line of the bumps placement. This embodiment provides a decreased effective gap of the sensor capacitor of the pressure sensing portion, which leads to an improved sensitivity over area.

In the embodiment shown in FIG. 9, the plurality of bumps 827 is fixed, e.g. glued, to a below side of the second rigid electrode 123 and extending from the second rigid electrode 123 in a direction to the deflectable membrane structure 122. The deflectable membrane structure 122 is not mechanically fixed, e.g. glued, to the second rigid electrode 123, e.g. stator. An action of the pressure ensures contact of the deflectable membrane structure 122 to the plurality of bumps 827. The deflectable membrane structure 122 is pressed to the plurality of bumps 827 to provide the contact between them. The plurality of bumps 827 become a mechanical fix point, or mechanical fix points, of the deflectable membrane structure 122, which prevents a translational movement of the deflectable membrane structure 122. This provides the smaller effective gap, e.g. gap between plates of the sense capacitor, defined by the bumps height, which provides higher sensitivity over the area.

In an alternative embodiment, the plurality of bumps 827 may be fixed, e.g. glued, to an upper side of the deflectable membrane structure 122 and extending from the deflectable membrane structure 122 in a direction to the second rigid electrode 123. An action of the pressure ensures contact of the plurality of bumps 827 fixed on the deflectable membrane structure 122 to the second rigid electrode 123. The deflectable membrane structure 122 with the bumps is pressed to the second rigid electrode 123 to provide the contact between the bumps 827 and the second rigid electrode 123. This prevents a translational movement of the deflectable membrane structure 122.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The sensor arrangement goo in accordance with the embodiment shown in FIG. 9 solves the problem of a capacitance mismatch between the reference capacitor and the sensor capacitor, as for example in the embodiment shown in FIG. 8. In the sensor arrangement 800 shown in FIG. 8 the effective gap in the sensor capacitor is much smaller than the gap of the reference capacitor. Therefore, the capacitance mismatch between the capacitors might be very high. In the sensor arrangement 900 shown in FIG. 9 the effective gap of the top reference capacitor is decreased and the effective gap is similar for the top, e.g. reference, capacitor and the bottom, e.g. sensor, capacitor. This solution provides avoidance of the large capacitance mismatch.

This embodiment provides a decreased effective gap of the reference capacitor of the pressure sensing portion. The effective gap is similar for the reference and sensor capacitor in this embodiment, which leads to a considerable decrease of the capacitance mismatch in the pressure sensing portion.

The first deflectable membrane element 111 of the sound transducing portion 110 and the first rigid electrode 121 of the pressure sensing portion 120 are arranged in the same plane with respect to the first main surface region 141 of the substrate 140. The counter electrode 113 of the sound transducing portion 110 and the second rigid electrode 123 of the pressure sensing portion 120 are arranged in the same plane with respect to the first main surface region 141 of the substrate 140. The second deflectable membrane element 112 of the sound transducing portion 110 and the deflectable membrane structure 122 of the pressure sensing portion 120 are arranged in the same plane with respect to the first main surface region 141 of the substrate 140.

The sensor arrangement 900 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region 141 of the substrate 140. The mechanical decoupling structure 430 enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 partially (or completely) spans the through opening 150 in the substrate 140. The through opening 150, e.g. cavity, e.g. a so-called Bosch cavity, comprises a first through opening portion 551, e.g. a so-called Bosch cavity, and a second through opening portion 552, e.g. a so-called Bosch cavity. The first through opening portion 551 is associated to the sound transducing portion 101 spanning at least partially (or completely) the first through opening portion 551. The second through opening portion 552 is associated with the pressure sensing portion 120 spanning at least partially (or completely) the second through opening portion 552. In an embodiment, the through opening 150 comprising the first through opening portion 551 and the second through opening portion 552 is etched in two steps to receive Bosch cavities. This results in a formation of the rigid mechanical connection—the mechanical decoupling structure 430—between the sound transducing portion 110, e.g. the microphone, and the pressure sensing portion 120, e.g. the pressure sensor, that provides sufficient decoupling between the membranes of the sound transducing portion 110 and the pressure sensing portion 120 and to implement the release of the pressure sensor structure.

In this embodiment, the pressure sensing portion 120 is thus released due to the Bosch cavities etched in one or more steps, e.g. in two steps. The sense, e.g. sensor, capacitor and the corresponding membrane, e.g. the deflectable membrane structure 122 are directly facing the back volume in this embodiment. The sound transducing portion 110 and the pressure sensing portion 120 are fluidically connected in parallel. This parallel connection solves the issue with the limited bandwidth of the pressure sensor in the sensor arrangements.

In an embodiment, the sensor arrangement goo is formed as a single chip, e.g. as a MEMS chip.

The sensor arrangement goo described above could be a part of a portable electronic device, e.g. a smartphone.

However, it should be noted that the sensor arrangement 900 may optionally be supplemented by any of the features, functionalities and details disclosed herein, both individually or taken in combination.

According to an embodiment, a sensor arrangement goo comprises a substrate 140 having a through opening 150 between a first 141 and a second main surface region thereof, a sound transducing portion 110 arranged at the first main surface region 141 of the substrate 140 and at least partially spanning the through opening 150 in the substrate 140, wherein the sound transducing portion 110 comprises a deflectable membrane structure, and an counter electrode 113, and a pressure sensing portion 120 arranged at the first main surface region 141 of the substrate 140 and fluidically coupled to the through opening 150 in the substrate 140, wherein the pressure sensing portion 120 comprises a first flexible electrode 121, a second rigid electrode 123 and a deflectable membrane structure 122 in a stacked configuration, wherein the deflectable membrane structure 122 of the pressure sensing portion 120 opposes the plane of the first main surface region 141 of the substrate 140, wherein a plurality of first bumps 827 is arranged between the second rigid electrode 123 and the deflectable membrane structure 122, wherein the plurality of first bumps 827 is positioned to form bearing points 828 between the deflectable membrane structure 122 and the second rigid electrode 123, wherein a continuous free space between the bearing points 828 defines the deflectable portion of the deflectable membrane structure 122, wherein a plurality of second bumps 978 is arranged between the first flexible electrode 121 and the second rigid electrode 123, wherein the plurality of second bumps 978 is positioned to form a fixed spacing between a portion of the first flexible electrode 141 defined by bearing points 828 between the first flexible electrode 121 and the second rigid electrode 123 formed by the plurality of second bumps 978 and the second rigid electrode 123, and wherein the portion of the first flexible electrode 121 formed by the plurality of second bumps 978 and the second rigid electrode 123 of the pressure sensing portion 120 form a reference capacitor of the pressure sensing portion 120, and wherein the second rigid electrode 123 and the membrane structure 122 form a sense capacitor of the pressure sensing portion 120 in a stacked configuration.

Figure 10:
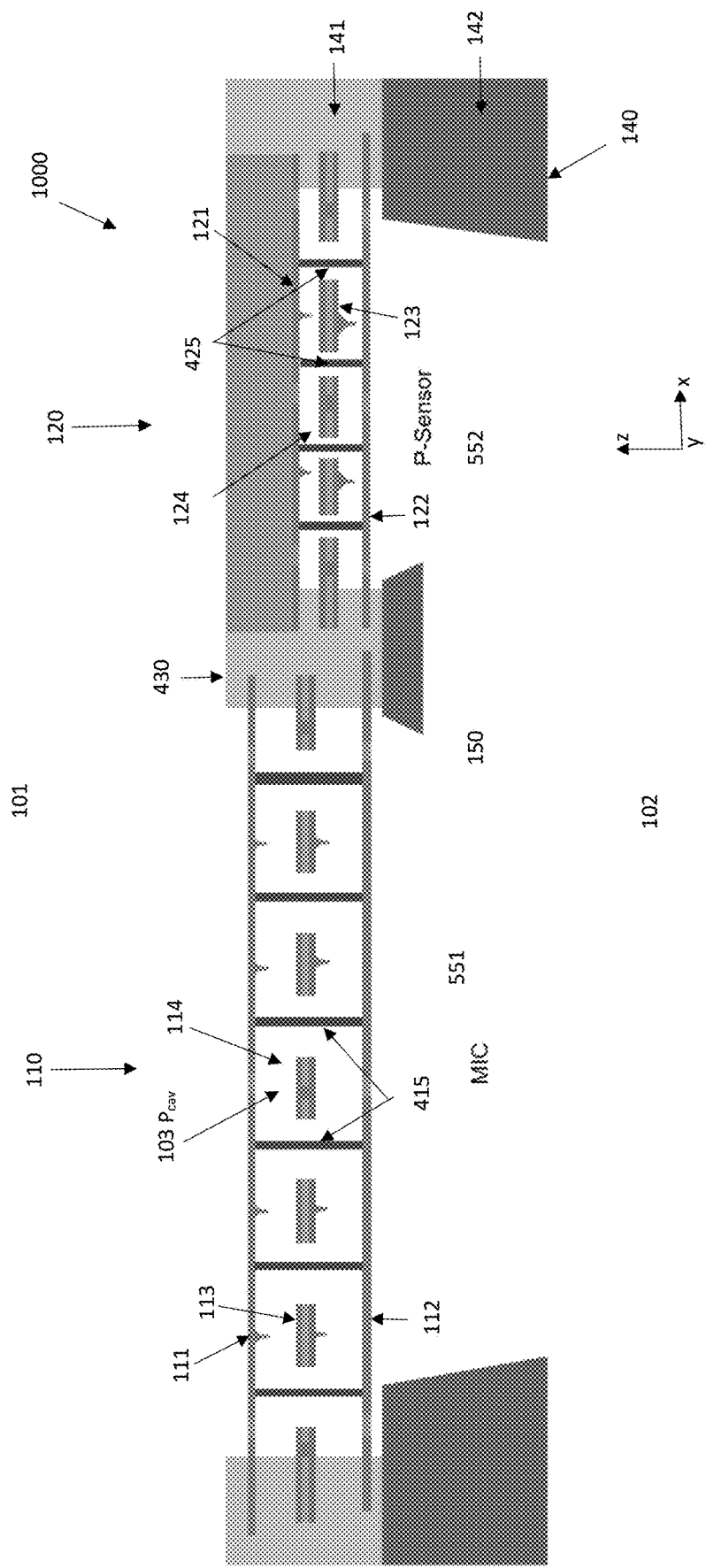
FIG. 10 shows a schematic cross-sectional view of a sensor arrangement according to an embodiment.

FIG. 10 shows a sensor arrangement 1000 in accordance with an embodiment. The sensor arrangement is schematically shown in a cross-sectional view, principally showing the inner structure of the sensor arrangement.

The sensor arrangement 1000, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first and second main surface regions.

The sensor arrangement 1000 comprises a sound transducing portion 110, e.g. a sound transducer, e.g. a microphone, and a pressure sensing portion 120, e.g. a pressure sensor. The sound transducing portion 110 is arranged at the first main surface region 141 of the substrate 140 and at least partially (or completely) spanning the through opening 150 in the substrate 140. The pressure sensing portion 120 is arranged at the first main surface region 141 of the substrate 140 and fluidically coupled to the through opening 150 in the substrate 140.

Both the sound transducing portion 110 and the pressure sensing portion 120 comprises three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110 senses the pressure difference between the front volume 101 and the back volume 102 ($P_{frontvolume} - P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided.

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. The mechanical coupling through pillars prevents the sound transducing portion 110 from deformation during the operation. The more stable construction of the sound transducing portion 110 is thus provided. At the same time, the deflectable portions of the first and second membrane elements 111, 112 are mechanically decoupled from the counter electrode 113.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate. The first rigid electrode 121 is a top poly-Si membrane, which is stiffened.

The first rigid electrode 121, e.g. a stiff membrane, makes the pressure sensing portion 120 insensitive to the pressure variations of the back volume 102. The pressure sensing portion 120 senses the pressure difference between the front volume 101 and a vacuum cavity 124 between the first rigid electrode 121 and the deflectable membrane structure 122 of the pressure sensing portion 120 ($P_{frontvolume} - P_{cavity}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The deflectable membrane structure 122 of the pressure sensing portion 120 comprises a deflectable portion. The deflectable portion of the deflectable membrane structure 122 is mechanically coupled through pillars 425 to the first rigid electrode 121 and mechanically decoupled from the second rigid electrode 123. The pillars prevent the pressure sensing portion from deformation during the operation.

The first deflectable membrane element 111 of the sound transducing portion 110 and the first rigid electrode 121 of the pressure sensing portion 120 are not arranged in the same plane, e.g. arranged in different planes, with respect to the first main surface region 141 of the substrate 140. The first rigid electrode 121 of the pressure sensing portion 120 is arranged in a plane, which is below a plane of the first deflectable membrane element 111 of the sound transducing portion 110 with respect to the first main surface region 141 of the substrate 140.

The counter electrode 113 of the sound transducing portion 110 and the second rigid electrode 123 of the pressure sensing portion 120 are not arranged in the same plane, e.g. arranged in different planes, with respect to the first main surface region 141 of the substrate 140. The second rigid electrode 123 of the pressure sensing portion 120 is arranged in a plane, which is below a plane of the counter electrode 113 of the sound transducing portion 110 with respect to the first main surface region 141 of the substrate 140.

The second deflectable membrane element 112 of the sound transducing portion 110 and the deflectable membrane structure 122 of the pressure sensing portion 120 are arranged in the same plane with respect to the first main surface region 141 of the substrate 140.

This embodiment provides a decreased effective gap of the reference capacitor of the pressure sensing portion.

The sensor arrangement 1000 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region 141 of the substrate 140. The mechanical decoupling structure 430 enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 partially (or completely) spans the through opening 150 in the substrate 140. The through opening 150, e.g. cavity, e.g. a so-called Bosch cavity, comprises a first through opening portion 551, e.g. a so-called Bosch cavity, and a second through opening portion 552, e.g. a so-called Bosch cavity. The first through opening portion 551 is associated to the sound transducing portion 101 spanning at least partially (or completely) the first through opening portion 551. The second through opening portion 552 is associated with the pressure sensing portion 120 spanning at least partially (or completely) the second through opening portion 552. In an embodiment, the through opening 150 comprising the first through opening portion 551 and the second through opening portion 552 is etched in one or more steps, e.g. in two steps, to receive Bosch cavities. This results in a formation of the rigid mechanical connection—the mechanical decoupling structure 430—between the sound transducing portion 110, e.g. the microphone, and the pressure sensing portion 120, e.g. the pressure sensor, that provides sufficient decoupling between the membranes of the sound transducing portion 110 and the pressure sensing portion 120 and to implement the release of the pressure sensor structure.

In this embodiment, the pressure sensing portion 120 is thus released due to the Bosch cavities etched in one or more steps, e.g. in two steps. The sense, e.g. sensor, capacitor and the corresponding membrane, e.g. the deflectable membrane structure 122 are directly facing the back volume in this embodiment. The sound transducing portion 110 and the pressure sensing portion 120 are fluidically connected in parallel. This parallel connection solves the issue with the limited bandwidth of the pressure sensor in the sensor arrangement.

In the sensor arrangement 1000 shown in FIG. 10 no additional area is required for the reference capacitors of the pressure sensing portion 120, e.g. the absolute pressure sensor, while maintaining a high sensor signal. This is provided due to the configuration, where the first and second rigid electrodes 121, 123 of the pressure sensing portion 120 form a reference capacitor and the second rigid electrode 123 and the deflectable membrane structure 122 of the pressure sensing portion 120 form a sense capacitor in a stacked configuration, e.g. in a vertically spaced and separated configuration.

In an embodiment, the sensor arrangement 1000 is formed as a single chip, e.g. as a MEMS chip.

The sensor arrangement 1000 described above could be a part of a portable electronic device, e.g. a smartphone.

However, it should be noted that the sensor arrangement 1000 may optionally be supplemented by any of the features, functionalities and details disclosed herein, both individually or taken in combination.

Figure 11:
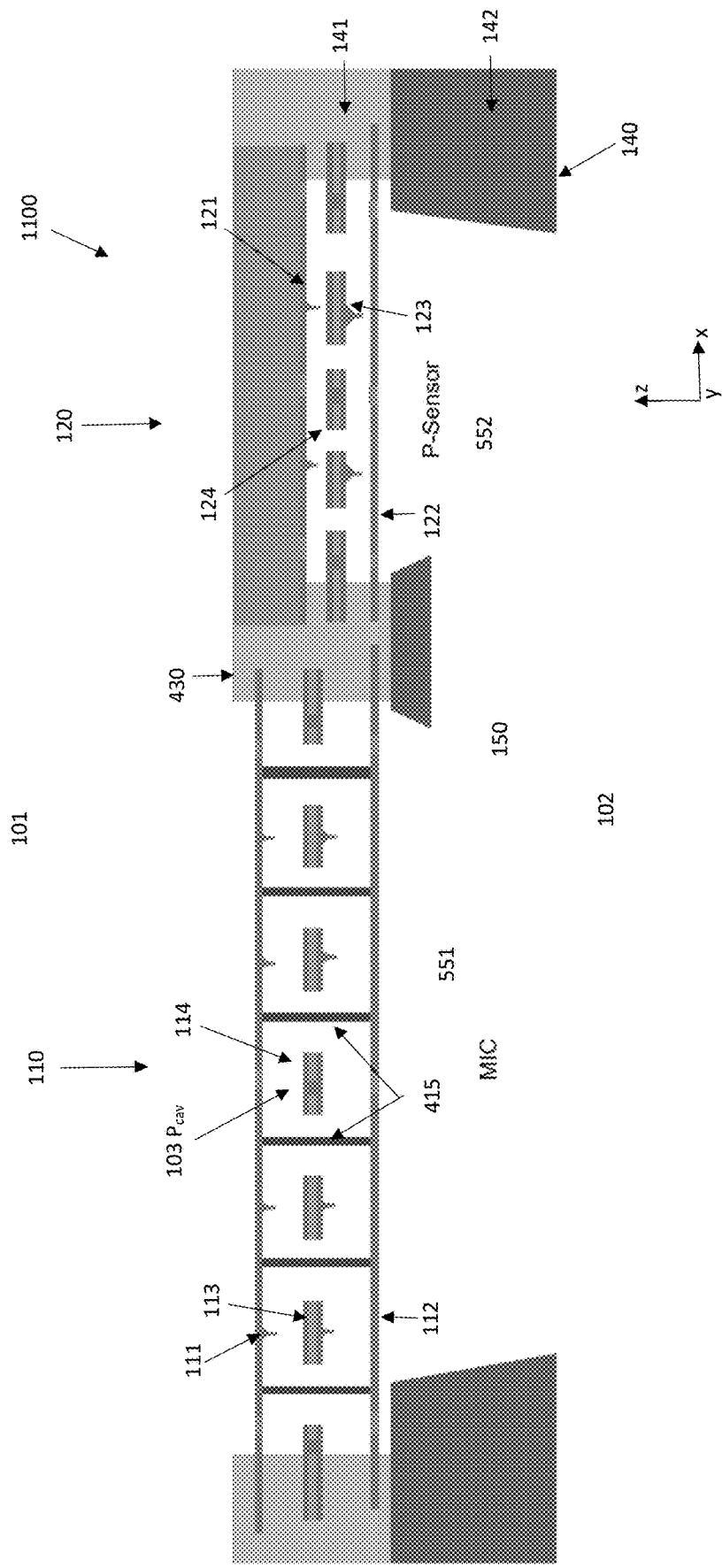
FIG. 11 shows a schematic cross-sectional view of a sensor arrangement according to an embodiment.

FIG. 11 shows a sensor arrangement 1100 in accordance with an embodiment. The sensor arrangement is schematically shown in a cross-sectional view, principally showing the inner structure of the sensor arrangement.

The sensor arrangement 1100, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first and second main surface regions.

The sensor arrangement 1100 comprises a sound transducing portion 110, e.g. a sound transducer, e.g. a microphone, and a pressure sensing portion 120, e.g. a pressure sensor. The sound transducing portion 110 is arranged at the first main surface region 141 of the substrate 140 and at least partially (or completely) spanning the through opening 150 in the substrate 140. The pressure sensing portion 120 is arranged at the first main surface region 141 of the substrate 140 and fluidically coupled to the through opening 150 in the substrate 140.

Both the sound transducing portion 110 and the pressure sensing portion 120 comprise three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110 senses the pressure difference between the front volume 101 and the back volume 102 ($P_{frontvolume}-P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided.

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. The mechanical coupling through pillars prevents the sound transducing portion 110 from deformation during the operation. The more stable construction of the sound transducing portion 110 is thus provided. At the same time, the deflectable portions of the first and second membrane elements 111, 112 are mechanically decoupled from the counter electrode 113.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate. The first rigid electrode 121 is a top poly-Si membrane, which is stiffened.

The first rigid electrode 121, e.g. a stiff membrane, makes the pressure sensing portion 120 insensitive to the pressure variations of the back volume 102. The pressure sensing portion 120 senses the pressure difference between the front volume 101 and a vacuum cavity 124 between the first rigid electrode 121 and the deflectable membrane structure 122 of the pressure sensing portion 120 ($P_{frontvolume}-P_{cavity}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The deflectable membrane structure 122 of the pressure sensing portion 120 comprises a deflectable portion. The deflectable portion of the deflectable membrane structure 122 of the pressure sensing portion 120 is mechanically decoupled from the first rigid electrode 121 and from the second rigid electrode 123. In this embodiment, an improved sensitivity of the membrane structure is provided due to an increased area of deflection.

The first deflectable membrane element 111 of the sound transducing portion 110 and the first rigid electrode 121 of the pressure sensing portion 120 are not arranged in the same plane, e.g. arranged in different planes, with respect to the first main surface region 141 of the substrate 140. The first rigid electrode 121 of the pressure sensing portion 120 is arranged in a plane, which is below a plane of the first deflectable membrane element 111 of the sound transducing portion 110 with respect to the first main surface region 141 of the substrate 140.

The counter electrode 113 of the sound transducing portion 110 and the second rigid electrode 123 of the pressure sensing portion 120 are not arranged in the same plane, e.g. arranged in different planes, with respect to the first main surface region 141 of the substrate 140. The second rigid electrode 123 of the pressure sensing portion 120 is arranged in a plane, which is below a plane of the counter electrode 113 of the sound transducing portion 110 with respect to the first main surface region 141 of the substrate 140.

The second deflectable membrane element 112 of the sound transducing portion 110 and the deflectable membrane structure 122 of the pressure sensing portion 120 are arranged in the same plane with respect to the first main surface region 141 of the substrate 140.

This embodiment provides a decreased effective gap of the reference capacitor of the pressure sensing portion.

The sensor arrangement 1101 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region 141 of the substrate 140. The mechanical decoupling structure 430 enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 partially (or completely) spans the through opening 150 in the substrate 140. The through opening 150, e.g. cavity, e.g. a so-called Bosch cavity, comprises a first through opening portion 551, e.g. a so-called Bosch cavity, and a second through opening portion 552, e.g. a so-called Bosch cavity. The first through opening portion 551 is associated to the sound transducing portion 101 spanning at least partially (or completely) the first through opening portion 551. The second through opening portion 552 is associated with the pressure sensing portion 120 spanning at least partially (or completely) the second through opening portion 552. In an embodiment, the through opening 150 comprising the first through opening portion 551 and the second through opening portion 552 is etched in one or more steps, e.g. in two steps, to receive Bosch cavities. This results in a formation of the rigid mechanical connection—the mechanical decoupling structure 430—between the sound transducing portion 110, e.g.

the microphone, and the pressure sensing portion 120, e.g. the pressure sensor, that provides sufficient decoupling between the membranes of the sound transducing portion 110 and the pressure sensing portion 120 and to implement the release of the pressure sensor structure.

In this embodiment, the pressure sensing portion 120 is thus released due to the Bosch cavities etched in one or more steps, e.g. in two steps. The sense, e.g. sensor, capacitor and the corresponding membrane, e.g. the deflectable membrane structure 122 are directly facing the back volume in this embodiment. The sound transducing portion 110 and the pressure sensing portion 120 are fluidically connected in parallel. This parallel connection solves the issue with the limited bandwidth of the pressure sensor in the sensor arrangement.

In the sensor arrangement 1100 shown in FIG. 11 no additional area is required for the reference capacitors of the pressure sensing portion 120, e.g. the absolute pressure sensor, while maintaining a high sensor signal. This is provided due to the configuration, where the first and second rigid electrodes 121, 123 of the pressure sensing portion 120 form a reference capacitor and the second rigid electrode 123 and the deflectable membrane structure 122 of the pressure sensing portion 120 form a sense capacitor in a stacked configuration, e.g. in a vertically spaced and separated configuration.

In an embodiment, the sensor arrangement 1101 is formed as a single chip, e.g. as a MEMS chip.

The sensor arrangement 100 described above could be a part of a portable electronic device, e.g. a smartphone.

However, it should be noted that the sensor arrangement 1100 may optionally be supplemented by any of the features, functionalities and details disclosed herein, both individually or taken in combination.

Figure 12:
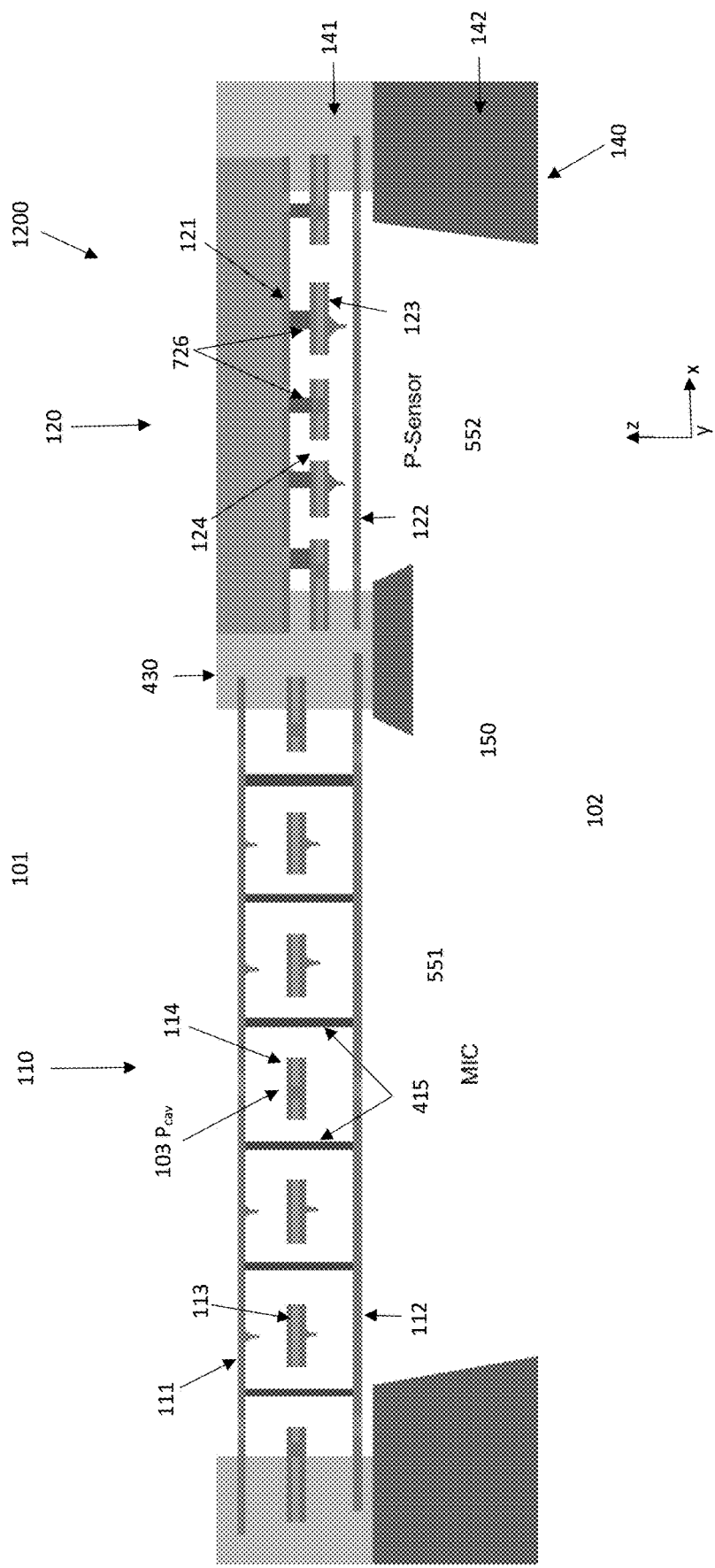
FIG. 12 shows a schematic cross-sectional view of a sensor arrangement according to an embodiment.

FIG. 12 shows a sensor arrangement 1200 in accordance with an embodiment. The sensor arrangement is schematically shown in a cross-sectional view, principally showing the inner structure of the sensor arrangement.

The sensor arrangement 1200, e.g. a combo sensor, comprises two portions, e.g. two structures, or e.g. two substructures, and a substrate 140. The substrate has a first main surface region 141, e.g. a front side, and a second main surface region 142, e.g. a back side, and has a through opening 150, e.g. a so-called Bosch cavity, between the first and second main surface regions.

The sensor arrangement 1200 comprises a sound transducing portion 110, e.g. a sound transducer, e.g. a microphone, and a pressure sensing portion 120, e.g. a pressure sensor. The sound transducing portion 110 is arranged at the first main surface region 141 of the substrate 140 and at least partially (or completely) spanning the through opening 150 in the substrate 140. The pressure sensing portion 120 is arranged at the first main surface region 141 of the substrate 140 and fluidically coupled to the through opening 150 in the substrate 140.

Both the sound transducing portion 110 and the pressure sensing portion 120 comprise three conductive layers described further in details. Each layer can be structured independently so as to enable 2 or more capacitors within the portions 110 and 120. This provides electrical independence of the sound transducing portion 110 and the pressure sensing portion 120 and allows the sound transducing portion 110 and the pressure sensing portion 120 to operate under different biasing conditions and with different operating points.

Both the sound transducing portion 110 and the pressure sensing portion 120 comprise deflectable membrane structures comprising movable sensing membranes.

The sound transducing portion 110 comprises a deflectable membrane structure 111, 112, e.g. comprising sensitive membranes, and a counter electrode 113, e.g. a back plate, e.g. a stator. The deflectable membrane structure of the sound transducing portion 110 comprises a first deflectable membrane element 111, e.g. a top membrane, and a second deflectable membrane element 112, e.g. a bottom membrane. The counter electrode 113 is sandwiched between the first and the second deflectable membrane elements 111, 112.

The sound transducing portion 110 senses the pressure difference between the front volume 101 and the back volume 102 ($P_{frontvolume} - P_{backvolume}$) and ignores the cavity pressure $P_{cav}$, 103, which is created within a cavity 114 between the first and second membrane elements 111, 112 of the sound transducing portion 110.

In an embodiment, the cavity 114 between the first and second membrane elements 111, 112 of the sound transducing portion 110 may be sealed against the environment, e.g. to provide an SDM (sealed dual membrane) microphone. An improved protection against dust and moisture ingress is provided.

The first deflectable membrane element 111 comprises a deflectable portion. The second deflectable membrane element 112 comprises a deflectable portion. The deflectable portions of the first and second membrane elements 111, 112 are mechanically coupled through pillars 415 to each other. The mechanical coupling through pillars prevents the sound transducing portion 110 from deformation during the operation. The more stable construction of the sound transducing portion 110 is thus provided. At the same time, the deflectable portions of the first and second membrane elements 111, 112 are mechanically decoupled from the counter electrode 113.

The pressure sensing portion 120 comprises a first rigid electrode 121, a second rigid electrode 123 and a deflectable membrane structure 122 in a stacked configuration, e.g. in a vertically spaced and separated configuration. The deflectable membrane structure 122 of the pressure sensing portion 120 opposes the plane of the first main surface region of the substrate. The first rigid electrode 121 is a top poly-Si membrane, which is stiffened.

The first rigid electrode 121, e.g. a stiff membrane, makes the pressure sensing portion 120 insensitive to the pressure variations of the back volume 102. The pressure sensing portion 120 senses the pressure difference between the front volume 101 and a vacuum cavity 124 between the first rigid electrode 121 and the deflectable membrane structure 122 of the pressure sensing portion 120 ($P_{frontvolume} - P_{cavity}$) and ignores the back-volume pressure $P_{backvolume}$.

The second rigid electrode 123 of the pressure sensing portion 120 is sandwiched between the first rigid electrode 121 and the deflectable membrane structure 122 of the pressure sensing portion 120. The first and second rigid electrodes 121, 123 of the pressure sensing portion 120 form a top capacitor, which is used as a reference capacitor of the pressure sensing portion 120. The second rigid electrode 123 and the deflectable membrane structure 122 of the pressure sensing portion 120 form a sense capacitor, e.g. a sensor capacitor, of the pressure sensing portion 120 in a stacked configuration, e.g. in a vertically spaced and separated configuration. The top reference capacitor is stacked up on top of the sense capacitor, e.g. vertically spaced and separated from the sense capacitor. The reference capacitor and the sense capacitor share the same middle electrode, namely a second rigid electrode 123, e.g. a stator. Due to these two capacitors sharing the same middle electrode, an area consumption is decreased.

The first rigid electrode 121 of the pressure sensing portion 120 is mechanically coupled through pillars 726 to the second rigid electrode 123 of the pressure sensing portion 120. The reference capacitor top electrode is thus further stiffened, e.g. by pillars connecting to the stator, improving an insensitiveness of the pressure sensing portion to the pressure variation of the back volume.

The deflectable membrane structure 122 of the pressure sensing portion 120 comprises a deflectable portion. The deflectable portion of the deflectable membrane structure 122 of the pressure sensing portion 120 is mechanically decoupled from the first rigid electrode 121 and from the second rigid electrode 123. In this embodiment, an improved sensitivity of the membrane structure is provided due to an increased area of deflection.

The first deflectable membrane element 111 of the sound transducing portion 110 and the first rigid electrode 121 of the pressure sensing portion 120 are not arranged in the same plane, e.g. arranged in different planes, with respect to the first main surface region 141 of the substrate 140. The first rigid electrode 121 of the pressure sensing portion 120 is arranged in a plane, which is below a plane of the first deflectable membrane element 111 of the sound transducing portion 110 with respect to the first main surface region 141 of the substrate 140.

The counter electrode 113 of the sound transducing portion 110 and the second rigid electrode 123 of the pressure sensing portion 120 are not arranged in the same plane, e.g. arranged in different planes, with respect to the first main surface region 141 of the substrate 140. The second rigid electrode 123 of the pressure sensing portion 120 is arranged in a plane, which is below a plane of the counter electrode 113 of the sound transducing portion 110 with respect to the first main surface region 141 of the substrate 140.

The second deflectable membrane element 112 of the sound transducing portion 110 and the deflectable membrane structure 122 of the pressure sensing portion 120 are arranged in the same plane with respect to the first main surface region 141 of the substrate 140.

This embodiment provides a decreased effective gap of the reference capacitor of the pressure sensing portion.

The sensor arrangement 1200 comprises a mechanical decoupling structure 430, arranged laterally between the sound transducing portion 110 and the pressure sensing portion 120 for mechanically decoupling a deflection, e.g. movement, of the deflectable membrane structure 111, 112 of the sound transducing portion 110 and a deflection, e.g. movement, of the deflectable membrane structure 122 of the pressure sensing portion 120. The mechanical decoupling structure 430 provides, e.g. enables, a mechanically independent movement of the deflectable membrane structure 111, 112 of the sound transducing portion 110 and of the deflectable membrane structure 122 of the pressure sensing portion 120, e.g. a mechanically independent movement of sensitive membranes of the sound transducing portion 110 and the pressure sensing portion 120. The mechanical decoupling structure 430 is anchored to the first main surface region 141 of the substrate 140. The mechanical decoupling structure 430 enables a mechanically independent movement of the sensitive membranes of the sound transducing portion and the pressure sensing portion. The mechanical decoupling structure 430 mechanically isolates the pressure sensing portion 120 from the sound transducing portion 110.

The pressure sensing portion 120 partially (or completely) spans the through opening 150 in the substrate 140. The through opening 150, e.g. cavity, e.g. a so-called Bosch cavity, comprises a first through opening portion 551, e.g. a so-called Bosch cavity, and a second through opening portion 552, e.g. a so-called Bosch cavity. The first through opening portion 551 is associated to the sound transducing portion 101 spanning at least partially (or completely) the first through opening portion 551. The second through opening portion 552 is associated with the pressure sensing portion 120 spanning at least partially (or completely) the second through opening portion 552. In an embodiment, the through opening 150 comprising the first through opening portion 551 and the second through opening portion 552 is etched in one or more steps, e.g. in two steps, to receive Bosch cavities. This results in a formation of the rigid mechanical connection—the mechanical decoupling structure 430—between the sound transducing portion 110, e.g. the microphone, and the pressure sensing portion 120, e.g. the pressure sensor, that provides sufficient decoupling between the membranes of the sound transducing portion 110 and the pressure sensing portion 120 and to implement the release of the pressure sensor structure.

In this embodiment, the pressure sensing portion 120 is thus released due to the Bosch cavities etched in one or more steps, e.g. in two steps. The sense, e.g. sensor, capacitor and the corresponding membrane, e.g. the deflectable membrane structure 122 are directly facing the back volume in this embodiment. The sound transducing portion 110 and the pressure sensing portion 120 are fluidically connected in parallel. This parallel connection solves the issue with the limited bandwidth of the pressure sensor in the sensor arrangement.

In the sensor arrangement 1200 shown in FIG. 12 no additional area is required for the reference capacitors of the pressure sensing portion 120, e.g. the absolute pressure sensor, while maintaining a high sensor signal. This is provided due to the configuration, where the first and second rigid electrodes 121, 123 of the pressure sensing portion 120 form a reference capacitor and the second rigid electrode 123 and the deflectable membrane structure 122 of the pressure sensing portion 120 form a sense capacitor in a stacked configuration, e.g. in a vertically spaced and separated configuration.

In an embodiment, the sensor arrangement 1200 is formed as a single chip, e.g. as a MEMS chip.

The sensor arrangement 1200 described above could be a part of a portable electronic device, e.g. a smartphone.

However, it should be noted that the sensor arrangement 1200 may optionally be supplemented by any of the features, functionalities and details disclosed herein, both individually or taken in combination.

The embodiments described referring to FIGS. 3 to 12 provides the following solutions:
  enabling a back-volume pressure sensing by exposing the absolute pressure sensor capacitor membrane directly to the back-volume;
  stacking the reference capacitor on top of the absolute pressure sensor capacitors with the additional stiffening of the reference structure to become insensitive to the back-volume pressure;
  the combination of the above described structure with a microphone structure in the same chip.

The embodiments described above have the required MEMS (microelectromechanical system) structures for detecting sound and absolute pressure on the same chip, have the required ASIC (application-specific integrated circuit) signal paths in a single chip, can be integrated in a bottom port package of a microphone of a portable electronic device, which is critical for the microphone performance. The embodiments described above do not show cross-talk meaning that the sound and pressure coexistence errors are negligible, not show any performance degradation due to the integration and at the same time demonstrate performance parity to their corresponding standalone devices.

FIGS. 13 to 16 show the embodiments of the substrate, which could be used in combination with any of the sensor arrangements as described above referring to FIGS. 1 to 12.

Figure 13B:
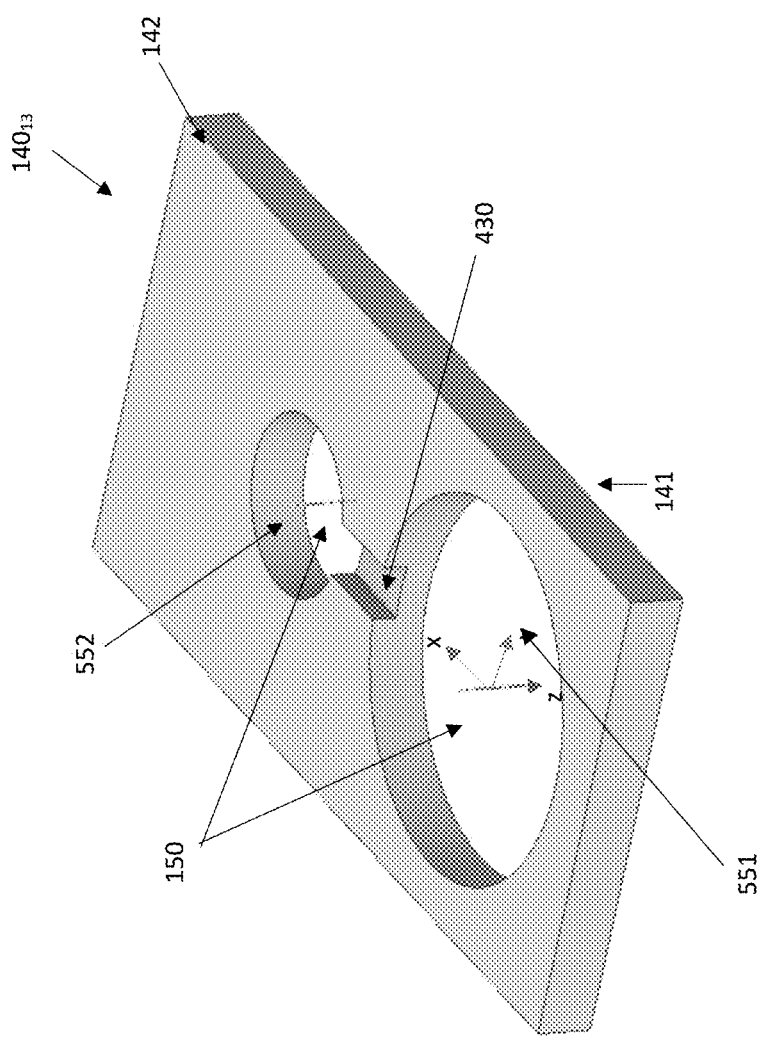
FIG. 13B shows a schematic perspective view of a substrate of a sensor arrangement according to an embodiment.
Figure 13A:
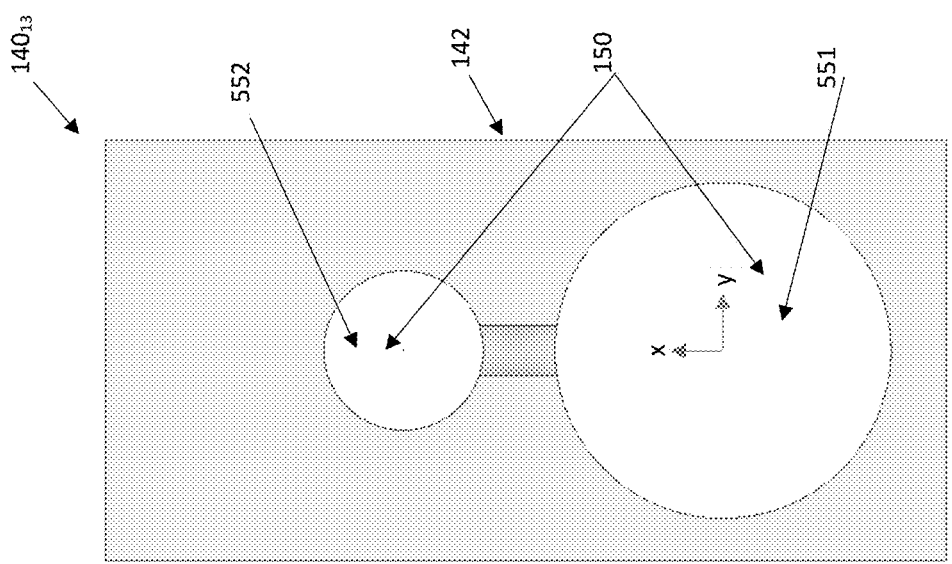
FIG. 13A shows a schematic plane view of a substrate of a sensor arrangement according to an embodiment.

FIGS. 13A and 13B show a substrate 140 in accordance with an embodiment. The substrate $140_{13}$ could be used as a substrate 140 of the sensor arrangements described above. FIG. 13A shows a schematic plane view of a substrate $140_{13}$, a schematic plane view of a second main surface 142 region of the substrate 1400 from a bottom side. FIG. 13B shows a schematic perspective view of a substrate $140_{13}$ arranged so that the first main surface region 141 of the substrate $140_{13}$ is below and the second main surface region 142 is above.

The substrate $140_{13}$ has a through opening 150, e.g. a so-called Bosch cavity, between a first 141 and a second 142 main surface region, e.g. between a front and a back side, thereof. A sound transducing portion 110 of any of sensor arrangements shown in FIGS. 1 to 12 and described above could be arranged at the first main surface region 141 of the substrate 1400 and at least partially (or completely) spanning the through opening 150 in the substrate $140_{13}$. A pressure sensing portion 120 of any of sensor arrangements shown in FIGS. 1 to 12 and described above could be arranged at the first main surface region 141 of the substrate $140_{13}$ and fluidically coupled to the through opening 150 in the substrate $140_{13}$.

The through opening 150, e.g. cavity, e.g. a so-called Bosch cavity, comprises a first through opening portion 551, e.g. a so-called Bosch cavity, and a second through opening portion 552, e.g. a so-called Bosch cavity. The first through opening portion 551 is associated to the sound transducing portion 110 of any of sensor arrangements shown in FIGS. 1 to 12 and described above spanning at least partially (or completely) the first through opening portion 551. The second through opening portion 552 is associated with the pressure sensing portion 120 of any of sensor arrangements shown in FIGS. 1 to 12 and described above spanning at least partially (or completely) the second through opening portion 552.

The first though opening portion 551 has a round contour. The second though opening portion 552 has a round contour. In an embodiment, the second though opening portion 552 may have a square contour or a rectangular contour.

The through opening 150 comprising the first through opening portion 551 and the second through opening portion 552 is etched in one or more steps, e.g. in two steps, to receive Bosch cavities. This results in a formation of the rigid mechanical connection—the mechanical decoupling structure 430—between the membranes of the sound transducing portion 110 spanning the first through opening portion 551 and the pressure sensing portion 120 spanning the second through opening portion 552. The mechanical decoupling structure 430 is formed as a protrusion between the through opening portions 551 and 552. The mechanical decoupling structure 430 is anchored to the first main surface region 141 of the substrate $140_{13}$. The mechanical decoupling structure enables a mechanically independent movement of the sensitive membranes of the sound transducing portion and the pressure sensing portion. The mechanical decoupling structure 430 mechanically isolates the pressure sensing portion 120 from the sound transducing portion 110.

In an embodiment, the substrate may comprise a plurality of the second through opening portions 552, arranged e.g. around the first through opening portion 551, or arranged e.g. at one side of the substrate $140_{13}$ opposing the other side of the substrate 140, where the first through opening portion 551 is arranged.

The substrate $140_{13}$ described above could be combined with any of the sensor arrangements 100, 400, 500, 700, 800, 900, 1000, 1100, 1200 shown and described referring to FIGS. 1, 4-5, 7-12.

However, it should be noted that the substrate $140_{13}$ may optionally be supplemented by any of the features, functionalities and details disclosed herein, both individually or taken in combination.

FIGS. 14A and 14B show a substrate $140_{14}$ in accordance with an embodiment. The substrate $140_{14}$ could be used as a substrate 140 of the sensor arrangements described above. FIG. 14A shows a schematic plane view of a substrate $140_{14}$, a schematic plane view of a second main surface 142 region of the substrate $140_{14}$ from a bottom side. FIG. 14B shows a schematic perspective view of a substrate $140_{14}$, arranged so that the first main surface region 141 of the substrate $140_{14}$ is below and the second main surface region 142 is above.

The substrate $140_{14}$ has a through opening 150, e.g. a so-called Bosch cavity, between a first 141 and a second 142 main surface region, e.g. between a front and a back side, thereof. A sound transducing portion 110 of any of sensor arrangements shown in FIGS. 1 to 12 and described above could be arranged at the first main surface region 141 of the substrate $140_{14}$ and at least partially (or completely) spanning the through opening 150 in the substrate $140_{11}$. A pressure sensing portion 120 of any of sensor arrangements shown in FIGS. 1 to 12 and described above could be arranged at the first main surface region 141 of the substrate $140_{14}$ and fluidically coupled to the through opening 150 in the substrate $140_{14}$.

The through opening 150, e.g. cavity, e.g. a so-called Bosch cavity, comprises a first through opening portion 551, e.g. a so-called Bosch cavity, a second through opening portion 552, e.g. a so-called Bosch cavity, and a third through opening portion 553, e.g. a so-called Bosch cavity. The first through opening portion 551 is associated to the sound transducing portion 110 of any of sensor arrangements shown in FIGS. 1 to 12 and described above spanning at least partially (or completely) the first through opening portion 551. The second through opening portion 552 and the third through opening portion 553 are associated with the pressure sensing portion 120 of any of sensor arrangements shown in FIGS. 1 to 12 and described above spanning at least partially (or completely) the second through opening portion 552 and the third through opening portion 553. The substrate $140_{14}$ could be used with the sensor arrangement comprising two pressure sensing portions, e.g. two pressure sensors.

The first though opening portion 551 has a round contour. The second though opening portion 552 has a round contour. The third though opening portion 553 has a round contour. In an embodiment, the second though opening portion 552 and the third though opening portion 553 may have a square contour or a rectangular contour.

The through opening 150 comprising the first through opening portion 551, the second through opening portion 552 and the third though opening portion 553 is etched in one or more steps, e.g. in two steps, to receive Bosch cavities. This results in a formation of the rigid mechanical connection—a first mechanical decoupling structure 430 and a second mechanical decoupling structure 430-2— between the membranes of the sound transducing portion 110 spanning the first through opening portion 551 and the pressure sensing portions spanning the second through opening portion 552 and the third through opening portion 553. The first and second mechanical decoupling structures 430, 430-2 are formed as protrusions between the first and the second through opening portions 551, 552 and between the first and the third through opening portions 551, 553 correspondingly. The first and second mechanical decoupling structures 430, 430-2 are anchored to the first main surface region 141 of the substrate $140_{14}$. The mechanical decoupling structure 430 enables a mechanically independent movement of the sensitive membranes of the sound transducing portion and the pressure sensing portion. The mechanical decoupling structure 430 mechanically isolates the pressure sensing portion 120 from the sound transducing portion 110.

The substrate $140_{14}$ described above could be combined with any of the sensor arrangements 100, 400, 50,700, 800, 90, 1000, 100, 1200 shown and described referring to FIGS. 1, 4-5, 7-12.

However, it should be noted that the substrate $140_{14}$ may optionally be supplemented by any of the features, functionalities and details disclosed herein, both individually or taken in combination.

FIGS. 15A and 15B show a substrate $140_{15}$ in accordance with an embodiment. The substrate $140_{15}$ could be used as a substrate 140 of the sensor arrangements described above. FIG. 15A shows a schematic plane view of a substrate $140_{15}$, a schematic plane view of a second main surface 142 region of the substrate 140 from a bottom side. FIG. 15B shows a schematic perspective view of a substrate $140_{15}$ arranged so that the first main surface region 141 of the substrate $140_{15}$ is below and the second main surface region 142 is above.

The substrate $140_{15}$ has a through opening 150, e.g. a so-called Bosch cavity, between a first 141 and a second 142 main surface region, e.g. between a front and a back side, thereof. A sound transducing portion 110 of any of sensor arrangements shown in FIGS. 1 to 12 and described above could be arranged at the first main surface region 141 of the substrate $140_{15}$ and at least partially (or completely) spanning the through opening 150 in the substrate $140_{15}$. A pressure sensing portion 120 of any of sensor arrangements shown in FIGS. 1 to 12 and described above could be arranged at the first main surface region 141 of the substrate $140_{15}$ and fluidically coupled to the through opening 150 in the substrate $140_{15}$.

The through opening 150, e.g. cavity, e.g. a so-called Bosch cavity, comprises a first through opening portion 551, e.g. a so-called Bosch cavity, a second through opening portion 552, e.g. a so-called Bosch cavity, and a third through opening portion 553, e.g. a so-called Bosch cavity. The first through opening portion 551 is associated to the sound transducing portion 110 of any of sensor arrangements shown in FIGS. 1 to 12 and described above spanning at least partially (or completely) the first through opening portion 551. The second through opening portion 552 and the third through opening portion 553 are associated with the pressure sensing portion 120 of any of sensor arrangements shown in FIGS. 1 to 12 and described above spanning at least partially (or completely) the second through opening portion 552 and the third through opening portion 553. The substrate 14015 could be used with the sensor arrangement comprising two pressure sensing portions, e.g. two pressure sensors.

The first though opening portion 551 has a round contour. The second though opening portion 552 has a rectangular contour. The third though opening portion 553 has a rectangular contour. In an embodiment, the second though opening portion 552 and the third though opening portion 553 may have a square contour or a round contour.

The through opening 150 comprising the first through opening portion 551, the second through opening portion 552 and the third though opening portion 553 is etched in two steps to receive Bosch cavities. This results in a formation of the rigid mechanical connection—a mechanical decoupling structure 430—between the membranes of the sound transducing portion 110 spanning the first through opening portion 551 and the pressure sensing portions spanning the second through opening portion 552 and the third through opening portion 553. The mechanical decoupling structure 430 is formed as a T-shaped protrusion between the through opening portions 551, 552 and 553. The mechanical decoupling structure 430 is anchored to the first main surface region 141 of the substrate 140. The mechanical decoupling structure 430 enables a mechanically independent movement of the sensitive membranes of the sound transducing portion and the pressure sensing portion. The mechanical decoupling structure 430 mechanically isolates the pressure sensing portion 120 from the sound transducing portion 110.

The substrate $140_{15}$ described above could be combined with any of the sensor arrangements 100, 400, 50,700, 800, 900, 1000, 1100, 1200 shown and described referring to FIGS. 1, 4-5, 7-12.

However, it should be noted that the substrate $140_{15}$ may optionally be supplemented by any of the features, functionalities and details disclosed herein, both individually or taken in combination.

FIGS. 16A and 16B show a substrate $140_{16}$ in accordance with an embodiment. The substrate $140_{16}$ could be used as a substrate 140 of the sensor arrangements described above. FIG. 16A shows a schematic plane view of a substrate $140_{16}$, a schematic plane view of a second main surface 142 region of the substrate $140_{16}$ from a bottom side. FIG. 16B shows a schematic perspective view of a substrate $140_{16}$, arranged so that the first main surface region 141 of the substrate $140_{16}$ is below and the second main surface region 142 is above.

The substrate $140_{16}$ comprises a first through opening portion 551, e.g. cavity, e.g. a so-called Bosch cavity, a second through opening portion 552, e.g. cavity, e.g. a so-called Bosch cavity, and a third through opening portion 553, e.g. cavity, e.g. a so-called Bosch cavity. The first through opening portion 551 is associated to the sound transducing portion 110 of any of sensor arrangements shown in FIGS. 1 to 12 and described above spanning at least partially (or completely) the first through opening portion 551. The second through opening portion 552 and the third through opening portion 553 are associated with the pressure sensing portion 120 of any of sensor arrangements shown in FIGS. 1 to 12 and described above spanning at least partially (or completely) the second through opening portion 552 and the third through opening portion 553. The substrate $140_{16}$ could be used with the sensor arrangement comprising two pressure sensing portions, e.g. two pressure sensors.

The through openings 551, 552, 553, e.g. a so-called Bosch cavity, are arranged between a first 141 and a second 142 main surface region, e.g. between a front and a back side, of the substrate $140_{16}$. A sound transducing portion 110 of any of sensor arrangements shown in FIGS. 1 to 12 and described above could be arranged at the first main surface region 141 of the substrate $140_{16}$ and at least partially (or completely) spanning the through opening 150 in the substrate $140_{16}$. A pressure sensing portion 120 of any of sensor arrangements shown in FIGS. 1 to 12 and described above could be arranged at the first main surface region 141 of the substrate $140_{16}$ and fluidically coupled to the through opening 150 in the substrate $140_{16}$.

The first though opening portion 551 has a round contour. The second though opening portion 552 has a round contour. The third though opening portion 553 has a round contour. In an embodiment, the second though opening portion 552 and the third though opening portion 553 may have a square contour or a rectangular contour.

An etching channel, e.g. a ventilation channel, could be used in this embodiment as a ventilation path for the pressure sensing portion.

The substrate $140_{16}$ described above could be combined with the sensor arrangement 600 shown and described referring to FIG. 6.

However, it should be noted that the substrate $140_{16}$ may optionally be supplemented by any of the features, functionalities and details disclosed herein, both individually or taken in combination.

Additional embodiments and aspects are described which may be used alone or in combination with the features and functionalities described herein.

According to an embodiment, a sensor arrangement, comprises a substrate having a through opening between a first and a second main surface region thereof, a sound transducing portion arranged at the first main surface region of the substrate and at least partially (or completely) spanning the through opening in the substrate, wherein the sound transducing portion comprises a deflectable membrane structure, and an counter electrode, and a pressure sensing portion arranged at the first main surface region of the substrate and fluidically coupled to the through opening in the substrate, wherein the pressure sensing portion comprises a first and second rigid electrode and a deflectable membrane structure in a stacked configuration, wherein the deflectable membrane structure of the pressure sensing portion opposes the plane of the first main surface region of the substrate, and wherein the first and second rigid electrodes of the pressure sensing portion form a reference capacitor of the pressure sensing portion, and wherein the second rigid electrode and the membrane structure form a sense capacitor of the pressure sensing portion in a stacked configuration.

According to an embodiment, the deflectable membrane structure of the sound transducing portion comprises a first deflectable membrane element and a second deflectable membrane element having the counter electrode sandwiched therebetween.

According to an embodiment, the first deflectable membrane element comprises a deflectable portion and the second deflectable membrane element comprises a deflectable portion, and wherein the deflectable portions of the first and second membrane elements are mechanically coupled to each other and are mechanically decoupled from the counter electrode.

According to an embodiment, a cavity between the first and second membrane element of the sound transducing portion is sealed against the environment.

According to an embodiment, the second rigid electrode of the pressure sensing portion is sandwiched between the first rigid electrode and the membrane structure of the pressure sensing portion.

According to an embodiment, the deflectable membrane structure of the pressure sensing portion comprises a deflectable portion, and the deflectable portion of the membrane structure is mechanically coupled to the first rigid electrode and mechanically decoupled from the second rigid electrode.

According to an embodiment, the deflectable membrane structure of the pressure sensing portion comprises a deflectable portion, and the deflectable portion of the membrane structure is mechanically decoupled from the first rigid electrode and from the second rigid electrode.

According to an embodiment, the deflectable membrane structure of the pressure sensing portion comprises a deflectable portion, and the first rigid electrode is mechanically coupled to the second rigid electrode, and the deflectable portion of the membrane structure is mechanically decoupled from the first rigid electrode and the second rigid electrode.

According to an embodiment, a plurality of first bumps is arranged between the second rigid electrode and the deflectable membrane structure, wherein the plurality of first bumps is positioned to form bearing points between the deflectable membrane and the second rigid electrode, wherein a continuous free space between the bearing points defines the deflectable portion of the deflectable membrane structure.

According to an embodiment, a plurality of first bumps is arranged between the second rigid electrode and the deflectable membrane structure, wherein the plurality of first bumps is positioned to form bearing points between the deflectable membrane and the second rigid electrode, wherein a continuous free space between the bearing points defines the deflectable portion of the deflectable membrane structure, and wherein a plurality of second bumps is arranged between the first rigid electrode and the second rigid electrode, wherein the plurality of second bumps is positioned to form a fixed spacing between the first and the second rigid electrode.

According to an embodiment, the first deflectable membrane element of the sound transducing portion and the first rigid electrode of the pressure sensing portion are arranged in the same plane, wherein the counter electrode of the sound transducing portion and the second rigid electrode of the pressure sensing portion are arranged in the same plane, and wherein the second deflectable membrane element of the sound transducing portion and the deflectable membrane structure of the pressure sensing portion are arranged in the same plane.

According to an embodiment, the sensor arrangement further comprises a mechanical decoupling structure laterally between the sound transducing portion and the pressure sensing portion for mechanically decoupling a deflection of the deflectable membrane structure of the sound transducing portion and a deflection of the deflectable membrane structure of the pressure sensing portion, wherein the mechanical decoupling structure is anchored to the first main surface region of the substrate.

According to an embodiment, the pressure sensing portion is fluidically connected to the through opening by means of a ventilation channel.

According to an embodiment, the pressure sensing portion at least partially spans the through opening.

According to an embodiment, the through opening comprises a plurality of through opening portions, wherein a first through opening portion is associated to the sound transducing portion spanning at least partially the first through opening portion, and wherein a second through opening portion is associated to the pressure sensing portion spanning at least partially the second through opening portion.

According to an embodiment, the sound transducing portion and the pressure sensing portion are fluidically connected in parallel.

According to an embodiment, the sensor arrangement is formed as a single chip.

According to an embodiment, a portable electronic device comprises the sensor arrangement according to any of the embodiments.

Additional embodiments and aspects are described which may be used alone or in combination with the features and functionalities described herein.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

Also, it should be noted that individual aspects described herein can be used individually or in combination. Thus, details can be added to each of said individual aspects without adding details to another one of said aspects.

In particular, embodiments are also described in the claims. The embodiments described in the claims can optionally be supplemented by any of the features, functionalities and details as described herein, both individually and in combination.

The herein described embodiments are merely illustrative for the principles of the present disclosure. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A sensor arrangement comprising:
   a substrate having a through opening between a first and a second main surface region thereof;
   a sound transducing portion arranged at the first main surface region of the substrate and at least partially spanning the through opening in the substrate;
   wherein the sound transducing portion comprises a deflectable membrane structure and a counter electrode; and
   a pressure sensing portion arranged at the first main surface region of the substrate and fluidically coupled to the through opening in the substrate,
   wherein the pressure sensing portion comprises a first rigid electrode and second rigid electrode, and a deflectable membrane structure in a stacked configuration,
   wherein the deflectable membrane structure of the pressure sensing portion is located opposite a plane of the first main surface region of the substrate,
   wherein the first and second rigid electrodes of the pressure sensing portion form a reference capacitor of the pressure sensing portion, and wherein the second rigid electrode and the deflectable membrane structure of the pressure sensing portion form a sense capacitor of the pressure sensing portion in the stacked configuration.

2. The sensor arrangement according to claim 1, wherein the deflectable membrane structure of the sound transducing portion comprises a first deflectable membrane element and a second deflectable membrane element having the counter electrode sandwiched therebetween.

3. The sensor arrangement according to claim 2, wherein the first deflectable membrane element comprises a deflectable portion and the second deflectable membrane element comprises a deflectable portion, and wherein the deflectable portions of the first and second membrane elements are mechanically coupled to each other and are mechanically decoupled from the counter electrode.

4. The sensor arrangement according to claim 2, wherein a cavity between the first and second membrane elements of the sound transducing portion is sealed against a surrounding environment.

5. The sensor arrangement according to claim 2,
   wherein the first deflectable membrane element of the sound transducing portion and the first rigid electrode of the pressure sensing portion are arranged in the same plane,
   wherein the counter electrode of the sound transducing portion and the second rigid electrode of the pressure sensing portion are arranged in the same plane, and
   wherein the second deflectable membrane element of the sound transducing portion and the deflectable membrane structure of the pressure sensing portion are arranged in the same plane.

6. The sensor arrangement according to claim 2,
   wherein the first deflectable membrane element of the sound transducing portion and the first rigid electrode of the pressure sensing portion are arranged in different planes,
   wherein the counter electrode of the sound transducing portion and the second rigid electrode of the pressure sensing portion are arranged in different planes, and
   wherein the second deflectable membrane element of the sound transducing portion and the deflectable membrane structure of the pressure sensing portion are arranged in the same plane.

7. The sensor arrangement according to claim 1, wherein the second rigid electrode of the pressure sensing portion is sandwiched between the first rigid electrode and the deflectable membrane structure of the pressure sensing portion.

8. The sensor arrangement according to claim 1, wherein the deflectable membrane structure of the pressure sensing portion comprises a deflectable portion, and the deflectable portion of the membrane structure is mechanically coupled to the first rigid electrode and mechanically decoupled from the second rigid electrode.

9. The sensor arrangement according to claim 1, wherein the deflectable membrane structure of the pressure sensing portion comprises a deflectable portion, and the deflectable portion of the membrane structure is mechanically decoupled from the first rigid electrode and from the second rigid electrode.

10. The sensor arrangement according to claim 1, wherein the deflectable membrane structure of the pressure sensing portion comprises a deflectable portion, and the first rigid electrode is mechanically coupled to the second rigid electrode, and the deflectable portion of the membrane structure is mechanically decoupled from the first rigid electrode and the second rigid electrode.

11. The sensor arrangement according to claim 10, wherein a plurality of first bumps is arranged between the second rigid electrode and the deflectable membrane structure of the pressure sensing portion, wherein the plurality of first bumps is positioned to form bearing points between the deflectable membrane structure of the pressure sensing portion and the second rigid electrode, wherein a continuous free space between the bearing points defines the deflectable portion of the deflectable membrane structure of the pressure sensing portion.

12. The sensor arrangement according to claim 10, wherein a plurality of first bumps is arranged between the second rigid electrode and the deflectable membrane structure of the pressure sensing portion, wherein the plurality of first bumps is positioned to form bearing points between the deflectable membrane structure of the pressure sensing portion and the second rigid electrode, wherein a continuous free space between the bearing points defines the deflectable portion of the deflectable membrane structure of the pressure sensing portion,
wherein a plurality of second bumps is arranged between the first rigid electrode and the second rigid electrode, and wherein the plurality of second bumps is positioned to form a fixed spacing between the first and the second rigid electrode.

13. The sensor arrangement according to claim 1, further comprising:
a mechanical decoupling structure laterally between the sound transducing portion and the pressure sensing portion for mechanically decoupling a deflection of the deflectable membrane structure of the sound transducing portion and a deflection of the deflectable membrane structure of the pressure sensing portion, wherein the mechanical decoupling structure is anchored to the first main surface region of the substrate.

14. The sensor arrangement according to claim 1, wherein the pressure sensing portion is fluidically connected to the through opening by a ventilation channel.

15. The sensor arrangement according to claim 1, wherein the pressure sensing portion at least partially spans the through opening.

16. The sensor arrangement according to claim 1, wherein the through opening comprises a plurality of through opening portions, wherein a first through opening portion is associated with the sound transducing portion spanning at least partially the first through opening portion, and wherein a second through opening portion is associated with the pressure sensing portion spanning at least partially the second through opening portion.

17. The sensor arrangement according to claim 1, wherein the sound transducing portion and the pressure sensing portion are fluidically connected in parallel.

18. The sensor arrangement according to claim 1, wherein the sensor arrangement is formed as a single chip.

19. A portable electronic device comprising: the sensor arrangement according to claim 1.

* * * * *